(12) United States Patent
Fujiwara

(10) Patent No.: US 8,270,041 B2
(45) Date of Patent: Sep. 18, 2012

(54) IMAGE PROCESSING APPARATUS FOR READING OPEN BOOK DOCUMENTS

(75) Inventor: Shingo Fujiwara, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 970 days.

(21) Appl. No.: 12/243,652

(22) Filed: Oct. 1, 2008

(65) Prior Publication Data

US 2009/0097076 A1    Apr. 16, 2009

(30) Foreign Application Priority Data

Oct. 11, 2007 (JP) ................................. 2007-265439

(51) Int. Cl.
*H04N 1/40* (2006.01)
*G06K 9/62* (2006.01)
*G03G 15/00* (2006.01)

(52) U.S. Cl. ........ 358/448; 358/449; 358/468; 358/470; 358/474; 358/496; 358/402; 358/1.12; 358/1.18; 358/1.9; 358/1.2; 358/1.6; 358/1.15; 358/296; 382/103; 382/108; 382/117; 382/128; 382/131; 382/141; 382/152; 382/206; 382/216; 382/239; 382/289; 382/305; 399/82; 399/83; 399/204; 399/365; 399/366; 399/367; 399/396; 399/405

(58) Field of Classification Search ........................ None
See application file for complete search history.

(56) References Cited

U.S. PATENT DOCUMENTS 4,696,563 A * 9/1987 Shibusawa .................... 399/204

(Continued)

FOREIGN PATENT DOCUMENTS

JP    H05-284330 A    10/1993

(Continued)

OTHER PUBLICATIONS

Japan Patent Office; Notice of Reasons for Rejection in Japanese Patent Application No. 2007-265439 mailed Oct. 27, 2009.

(Continued)

*Primary Examiner* — Steven Kau
(74) *Attorney, Agent, or Firm* — Baker Botts L.L.P.

(57) ABSTRACT

An image processing apparatus includes a reading unit configured to read an open document. The open document includes a first page including a first image and a second page including a second image. The apparatus also includes a storing unit configured to store the first page read by the reading unit as first page image data including the first image, and to store the second page read by the reading unit as second page image data including the second image. The apparatus further includes a designating unit configured to identify whether the open document is a first type of open document or a second type of open document which is different than the first type of open document, a rotation unit configured to rotate the first page image data 180 degrees when the open document is the first type of open document and to rotate the second page image data 180 degrees when the open document is the second type of open document, and an output unit configured to record a portion of the first image data and a portion of the second image data on a single recording medium. Moreover, the portion of the first image data includes the first image and the portion of the second image data includes the second image, and an orientation of the first image data on the single recording medium is the same as an orientation of the second image data on the single recording medium.

20 Claims, 27 Drawing Sheets

U.S. PATENT DOCUMENTS

| | | | |
|---|---|---|---|
| 5,777,749 A * | 7/1998 | Noda et al. | 382/239 |
| 6,281,983 B1 * | 8/2001 | Takahashi et al. | 358/1.2 |
| 2004/0190067 A1 * | 9/2004 | Owen | 358/2.1 |
| 2005/0190067 A1 * | 9/2005 | Black et al. | 340/628 |
| 2007/0168883 A1 * | 7/2007 | Sugimoto | 715/818 |

FOREIGN PATENT DOCUMENTS

| | | |
|---|---|---|
| JP | H09-093378 A | 4/1997 |
| JP | H09-298640 A | 11/1997 |
| JP | 2000-165616 A | 6/2000 |
| JP | 2006-197270 A | 7/2006 |
| JP | 2006-254073 A | 9/2006 |

OTHER PUBLICATIONS

The State Intellectual Property Office of the People'S Republic of China; Notification of First Office Action in Chinese Patent Application No. 200810169271.4 issued Mar. 30, 2010.

* cited by examiner

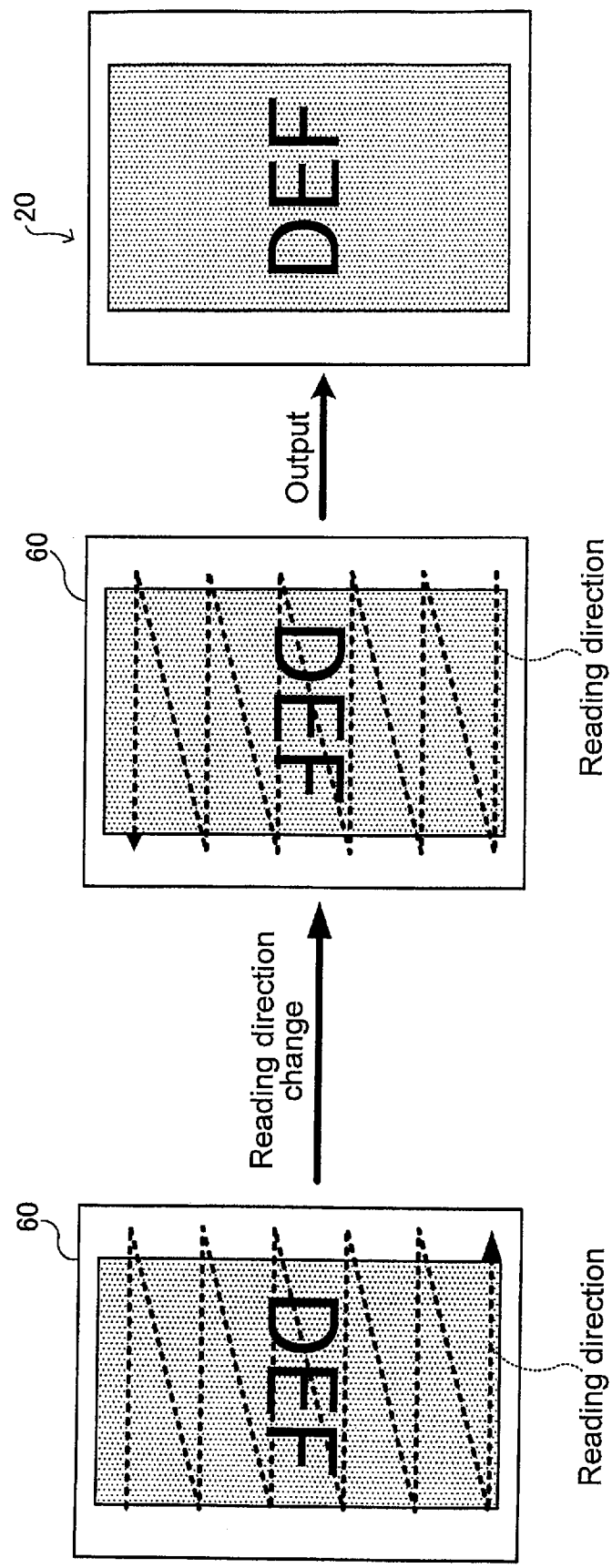

IMAGE PROCESSING APPARATUS FOR READING OPEN BOOK DOCUMENTS

BACKGROUND OF THE INVENTION

1. Field of the Invention

The present invention relates generally to image processing apparatus and methods of controlling such image processing apparatus. In particular, the present invention is directed towards image processing apparatus and methods of controlling such image processing apparatus in which an open document comprising at least a first page and a second page is read, and an image corresponding to the first page and an image corresponding to the second page are output on a single recording medium independent of whether the open document is a right-open type of open document or a left-open type of open document.

2. Description of the Related Art

A known image processing apparatus is configured to read an open document, such as a book, via a scanner, and to output the image read from the open document. The open document may comprise a binding portion and a plurality of documents pages bound at the binding portion. The known image processing apparatus may have a first mode for reading images from the open document on a page by page basis, and a second mode for reading images from the open document when the open document is in an open state, e.g., when document pages are arranged on the left side and the right side, respectively, such that the scanner may read two document pages.

When the open document is in the open state, the reading range of the scanner may be less than the range of the document pages to be read. Consequently, the scanner may not read the entire image on the document pages, and the output from the image processing apparatus may not correspond to the image on the document pages.

In another known image processing apparatus, such as the image processing apparatus described in Japanese Published Unexamined Patent Application No. H09-298640, when the reading range of the scanner is less than the range of the document pages to be read, the document pages are moved with respect to the scanner to acquire image data for each portion of the document pages, and the acquired image data then is arranged to generate an output image corresponding to the image on the document pages.

There are two types of open documents. The first type of open document is a "right-open" type open document in which the binding portion is on the right side of the document, the second type of open document is a "left-open" type open document in which the binding portion is on the left side document of the document. In general, a "horizontal-writing" open document is left-open type of open document, and a "vertical-writing" open document is right-open type of open document. In a left-open type open document, document pages are arranged, such that the document is read from the left page to the right page. In contrast, in a right-open type of open document, document pages are arranged, such that the document is read from the right page to the left page.

In the known image processing apparatus, when the reading range of the scanner is less than the range of the document pages to be read, after the first document page is read by the scanner, the open document is rotated 180 degrees horizontally with respect to the scanner, and the scanner then reads the second document page. Thus, the image which the scanner reads on the first page is inverted with respect to the image which the scanner reads on the second page. As such, unless either the image from the first page or the image second page is rotated 180 degrees after the scanner reads the image, different portions of the outputted image will have different orientations. Nevertheless, whether the image obtained from the first document page or the image obtained from the second document page should be rotated 180 degrees depends on whether the open document is a right-open type of open document or a left-open type of open document. This known image processing apparatus cannot determine whether the open document is a right-open type of open document or a left-open type of open document. Consequently, this known image processing apparatus cannot identify which portion of the image to be outputted should be rotated 180 degrees.

SUMMARY OF THE INVENTION

Therefore, a need has arisen for image processing apparatus which overcome these and other shortcomings of the related art. A technical advantage of the present invention is that an open document comprising at least a first page and a second page is read, and an image corresponding to the first page and an image corresponding to the second page are output on a single recording medium independent of whether the open document is a right-open type of open document or a left-open type of open document.

According to an embodiment of the present invention, an image processing apparatus comprises a reading unit configured to read an open document. The open document comprises a first page comprising a first image and a second page comprising a second image. The apparatus also comprises a storing unit configured to store the first page read by the reading unit as first page image data comprising the first image, and to store the second page read by the reading unit as second page image data comprising the second image. The apparatus further comprises a designating unit configured to identify whether the open document is a first type of open document or a second type of open document which is different than the first type of open document, a rotation unit configured to rotate the first page image data 180 degrees when the open document is the first type of open document and to rotate the second page image data 180 degrees when the open document is the second type of open document, and an output unit configured to record at least one portion of the first image data and at least one portion of the second image data on a single recording medium. Moreover, the at least one portion of the first image data comprises the first image and at least one portion of the second image data comprises the second image, wherein an orientation of the first image data on the single recording medium is the same as an orientation of the second image data on the single recording medium.

According to another embodiment of the present invention, a method of controlling an image processing apparatus comprises the step of reading an open document. The open document comprises a first page comprising a first image and a second page comprising a second image. The method also comprises the steps of storing the first page as first page image data comprising the first image, storing the second page as second page image data comprising the second image, and identifying whether the open document is a first type of open document or a second type of open document which is different than the first type of open document. The method further includes rotating the first page image data 180 degrees when the open document is the first type of open document, and rotating the second page image data 180 degrees when the open document is the second type of open document, and recording at least one portion of the first image data and at least one portion of the second image data on a single recording medium. Moreover, the at least one portion of the first image data comprises the first image and at least one portion of the second image data comprises the second image, and an orientation of the first image data on the single recording medium is the same as an orientation of the second image data on the single recording medium. In yet other embodiment of the present invention, a computer-readable medium may perform these method steps when executed by a processing arrangement.

Other advantages of the present invention will be apparent to persons of ordinary skill in the art in view of the following detailed description of the invention and the accompanying drawings.

BRIEF DESCRIPTION OF THE DRAWINGS

For a more complete understanding of the present invention, the needs satisfied thereby, and the objects, features, and advantages thereof, reference now is made to the following description taken in connection with the accompanying drawings.

FIG. 27 is view depicting a mode of a first page image rotation setting process and a second page image rotation setting process, according to still yet another embodiment of the present invention.

DETAILED DESCRIPTION OF EMBODIMENTS

Embodiments of the present invention may be understood by referring to FIGS. 1-27, like numerals being used for like corresponding parts in the various drawings.

Figure 1:
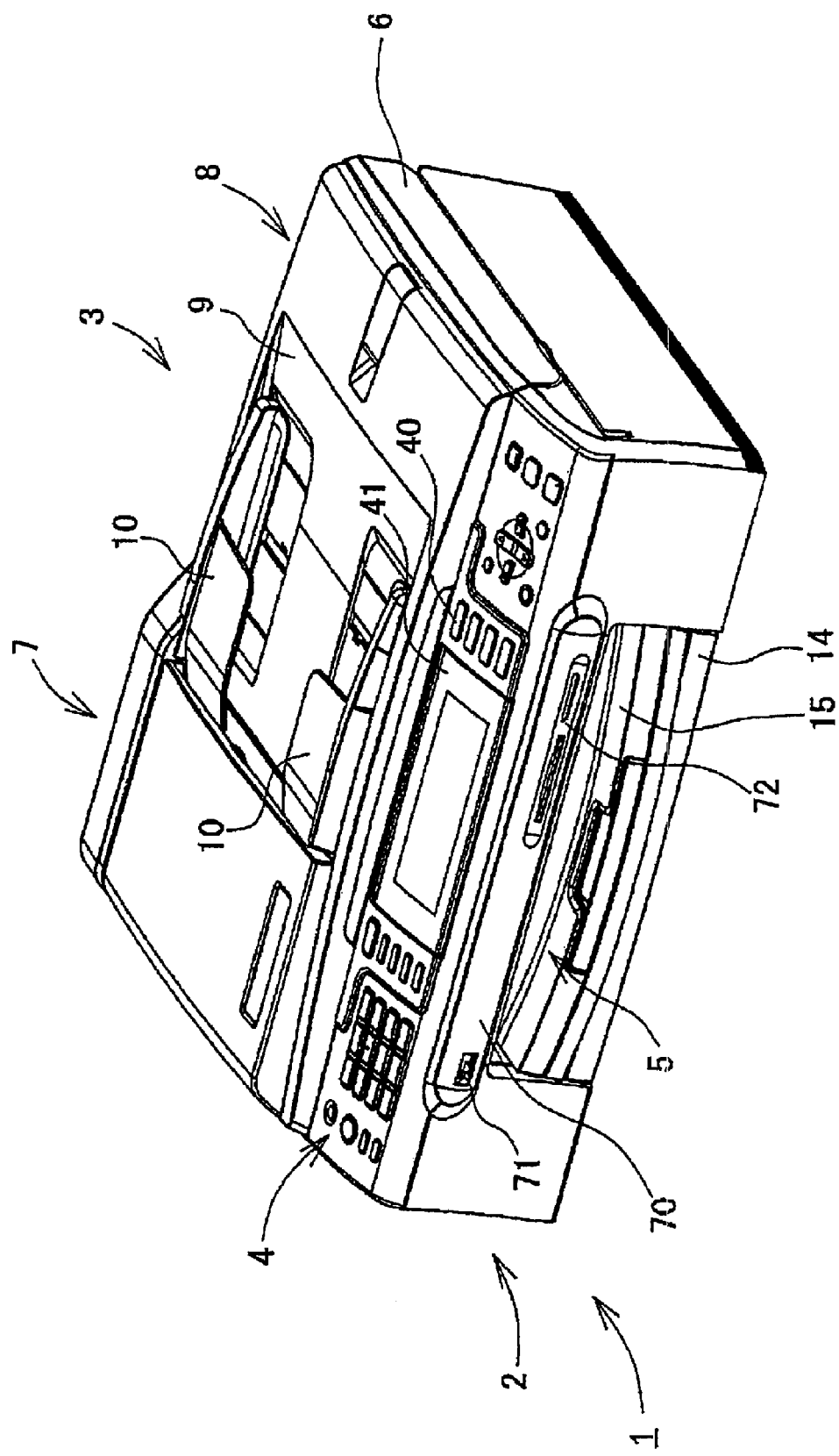
FIG. 1 is a perspective view of a multi function device, according to an embodiment of the present invention.
Figure 2:
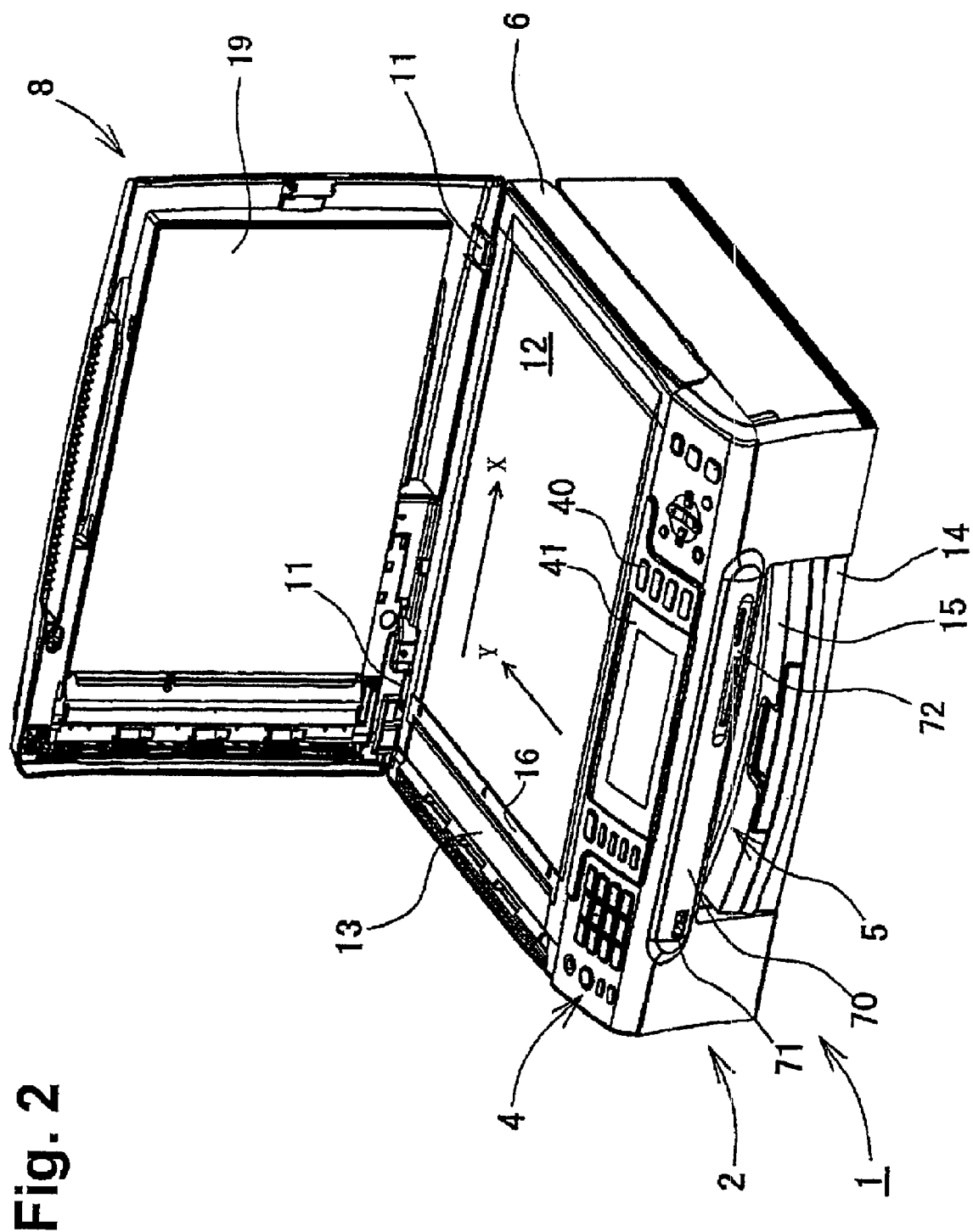
FIG. 2 is a perspective view of the multi function device of FIG. 1, in which a document cover is in an open position.

Referring to FIGS. 1 and 2, a multi function device ("MFD") 1 is depicted. The MFD 1 may comprise a printer 2, e.g., an ink jet printer, positioned at a lower portion of MFD 1, a scanner 3 positioned at an upper portion of the MFD 1, and an operation panel 4 positioned on the front side of the scanner 3. The MFD 1 may be configured to perform a printing function, a scanning function, a copying function, or a facsimile function, or any combination thereof.

The MFD 1 may be connected to a computer (not shown), and may be configured to record images on a recording medium 20, such as a printing paper, based on image data received from the computer. The MFD 1 also may be connected to an external device, such as a digital camera, and may be configured to record image data received from the external device. The MFD 1 further may be configured to receive a storage media, such as a memory card, and image data or the like stored in the storage media may be recorded on recording medium 20.

The scanner 3 may be a flatbed scanner comprising a document reading base 6 and a document cover 8 connected to the reading base 6 via hinges, such that the document cover 8 is configured to pivot to selectively cover and uncover the reading base 6. An auto document feeder 7 may be positioned on the document cover 8, and a document presser 19 may be positioned on the back side of the document cover 8. The document presser 19 may be a plate-like member comprising at least one white surface which is fixed in a downward direction.

The auto document feeder 7 may be configured to feed a document from a document tray 9 to a document receiving tray 10 through a document feed path. A document front end sensor (not shown) may be positioned in the auto document feeder 7 and may be configured to detect a front end of a document. In operation, document feeding control may be performed by setting the front end of the document detected by the document front end sensor as a reference position.

Figure 3:
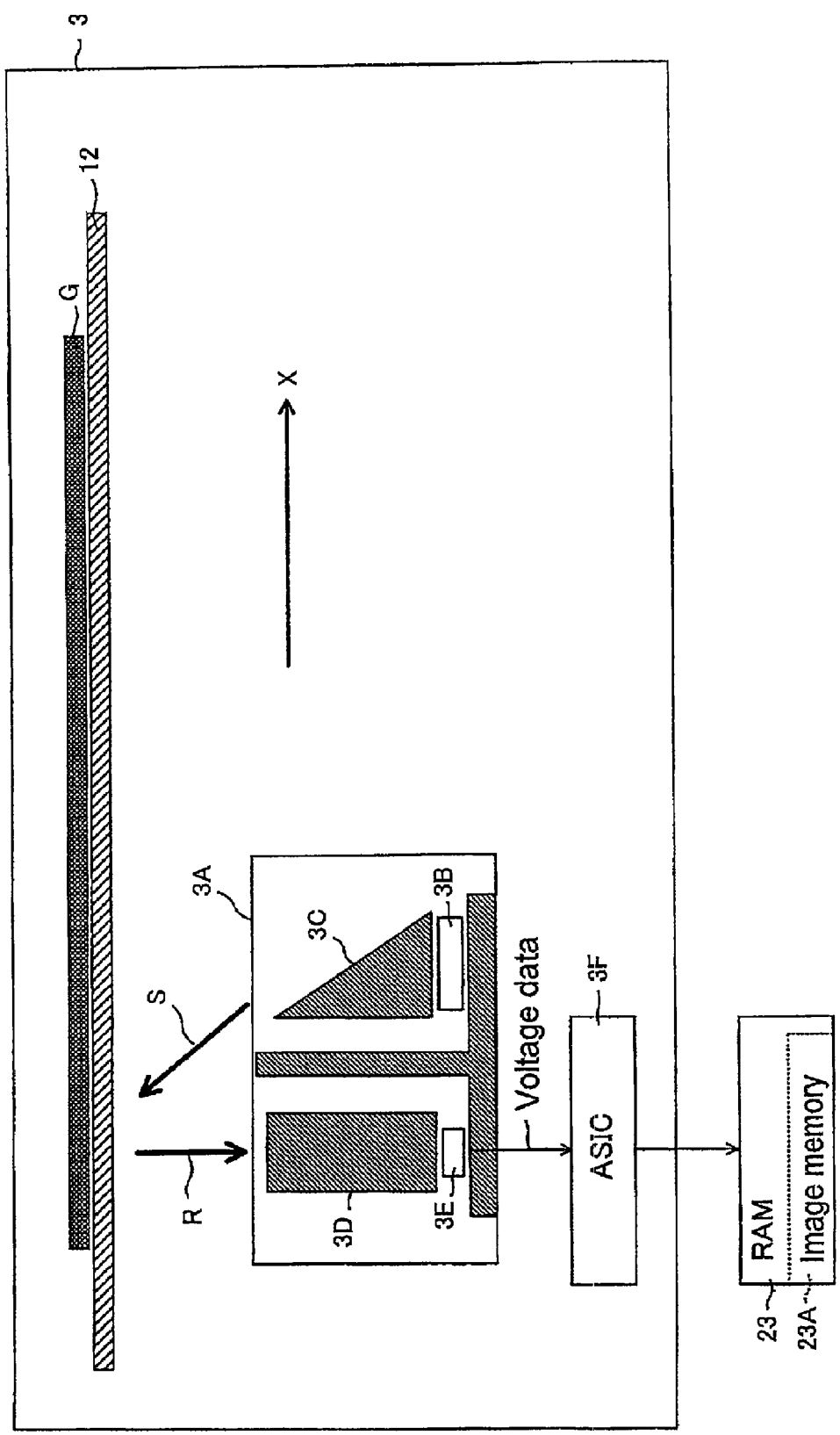
FIG. 3 is a front, sectional view of a scanner of the multi function device of FIG. 1, according to an embodiment of the present invention.

The upper surface of the document reading base 6 may be substantially opened, and a platen glass 12 may be fitted into the opening. A document guide 16 may be positioned at a first end of an upper surface of the platen glass 12. The document guide 16 may be configured to guide a document to a predetermined position by contacting one side of the document to position the document on the upper surface of the platen glass 12. Referring to FIG. 3, an image reading unit 3A may be positioned in the document reading base 6. The image reading unit 3A may be configured to reciprocate in the sub-scanning direction, e.g., the X direction. The image reading unit 3A and a drive mechanism of the image reading unit 3A may be positioned on a support member.

Referring again to FIGS. 1 and 2, document cover 8 may be opened, and a document may be positioned on the platen glass 12. The document then may be fixed between the platen glass 12 and the document presser 19 by closing the document cover 8. A start reading instruction then may be inputted, and the image reading unit 3A reciprocates in the sub-scanning direction X along the back surface of the platen glass 12 to read an image of the document.

When the document, e.g., an open document G, such as a book document, is relatively thin, the image read by the image reading unit 3A may include a portion of the document as a white image, and when the document is relatively thick, the image read by the image reading unit 3A may include a portion of the document as a black image. In contrast, when a document automatically is fed and is read using the auto document feeder 7, the document passes through the reading surface 13 on the document reading base 6. At this time, the image reading unit 3A is positioned below the reading surface 13. Therefore, in the document feeding process, when the document passes through the reading surface 13, the document image data is read by the image reading unit 3A. Image reading by the auto document feeder 7 may be performed when the document cover 8 is in the closed position.

The printer 2 may be configured to record an image on a recording medium 20 by selectively discharging ink droplets based on image data read by the scanner 3 or based on externally inputted image data. An opening 5 may be formed at the front side of the printer 2, and a paper feed tray 14 and a paper receiving tray 15 may be positioned within the opening 5. The paper feed tray 14 may be positioned below the paper receiving tray 15, and the paper feed tray 14 may house the recording medium 20. Therefore, in operation, the paper feed tray 14 may feed the recording medium 20 to the printer 2, the printer 2 may form an image on the fed recording medium 20, and the recording medium 20 having the image formed thereon may be discharged to the paper receiving tray 15.

The operation panel 4 may comprise operation keys 40 and a liquid crystal display ("LCD") 41. The operation keys 40 may comprise an arrow key and a numeric key pad, and a user may input a desired instruction using the operation panel 4. When the user inputs a predetermined instruction, various operation controls may be performed. The LCD 41 may display a preview screen and various setting screens.

A connection panel 70 may be positioned above the opening 5, and a USB terminal 71 may be positioned on the left end side of the connection panel 70. The USB terminal 71 may be a connector terminal which connects the MFD 1 to the external device via a USB connection. A slot section 72 may be positioned on the right end side of the connection panel 70. The slot section 72 may comprise a plurality of card slots which may be card-type slots configured to receive memory devices therein. When the card slot receives a card type memory, the contents stored in the card-type memory may be readout by the MFD 1.

Referring to FIG. 3, the image reading unit 3A may be configured to read a document. The image reading unit 3A may comprise a LED 3B, a light guide 3C, a light guide 3D, and a plurality of image pickup devices 3E for one line along the main scanning direction Y. The image reading unit 3A may be configured to reciprocate in the sub-scanning direction X.

The LED 3B functions as a light source for irradiating light. The light guide 3C converges light to a reading portion of a document. Then, the image pickup devices 3E output voltages based on the received light intensities. The light guide 3D condenses reflected light reflected from the document to the image pickup devices 3E.

When a document is positioned on the upper surface of the platen glass 12, and a document reading button of the operation keys 40 is selected, the image reading unit 3A is moved to a document reading start position, and document reading begins. First, the LED 3B is turned on to irradiate light. The path of the light is altered by the light guide 3C and is irradiated toward the upper side of the image pickup devices 3E as irradiation light S. Reflected light R reflected toward the image pickup devices 3E of the light reflected by the surface of the document is condensed by the light guide 3D and is received by the image pickup devices 3E. The image pickup devices 3E may comprise a CMOS sensor or the like, and may output voltage values based on the intensities of the received light, and the outputted voltage values may be inputted into an ASIC 3F. The plurality of image pickup devices 3E may be arranged in a line in the main scanning direction, e.g., the Y direction, and one of devices 3E forms one pixel of one line of image data. After one line of the document is read, the image reading unit 3A is moved a predetermined distance in the sub-scanning direction for reading the next line, and the next line is read. The entire document may be read by repeating this operation. The predetermined distance which the image reading unit 3A moves may be selected based on resolution or the like.

The ASIC 3F may be an integrated circuit configured to output voltage values inputted from each image pickup device 3E as image data. Specifically, the ASIC 3F may convert voltage values inputted from each image pickup device 3E into 16-bit numerical data, may perform various data corrections, and then may output these as image data. The image data outputted from the ASIC 3F then may be written into an image memory 23A of a RAM 23 via a bus line 25 and stored as image data.

Figure 4:
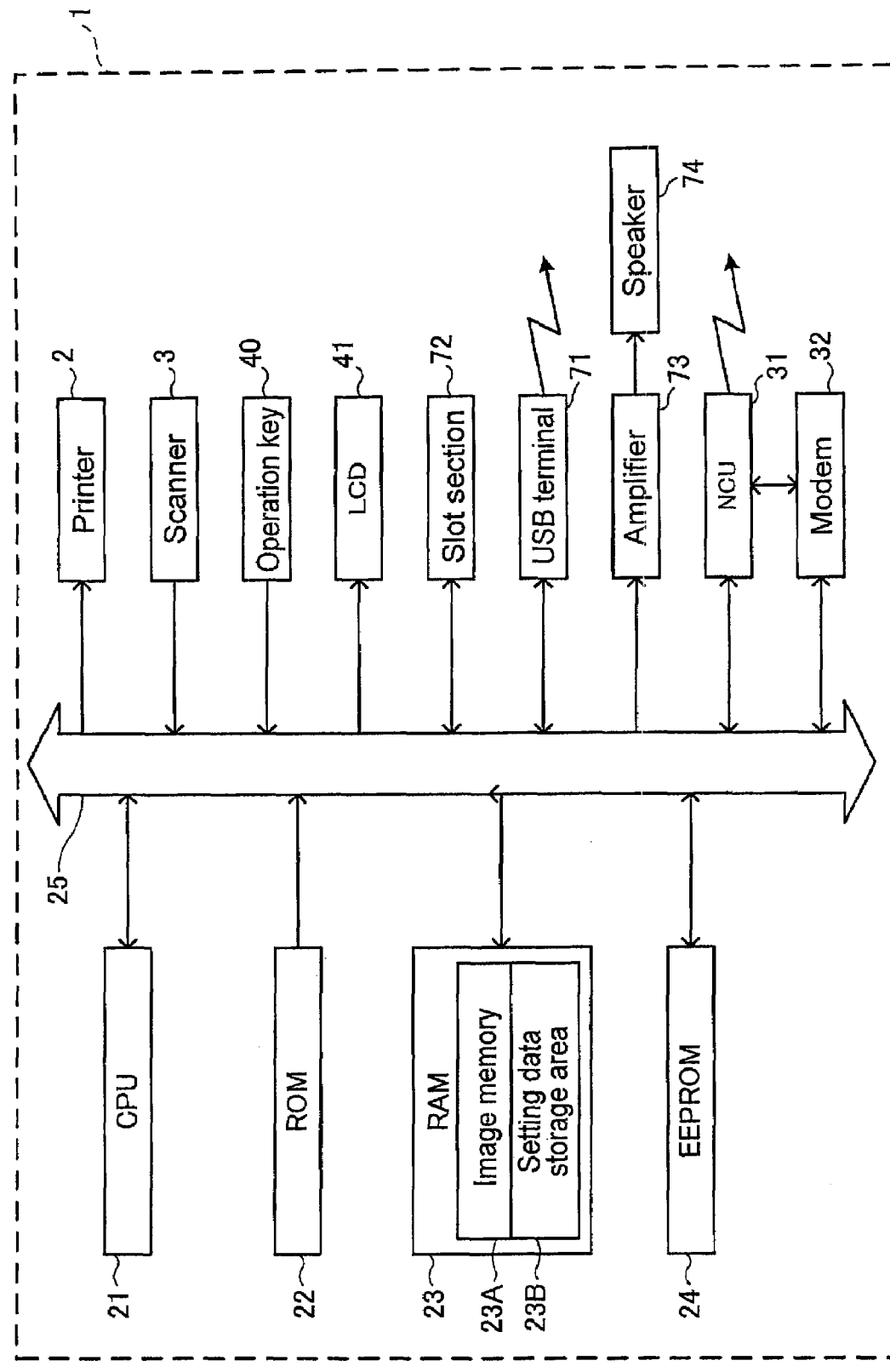
FIG. 4 is a block diagram of a control system of the multi function device of FIG. 1, according to an embodiment of the present invention.

Referring to FIG. 4, the MFD 1 further may comprise a CPU 21, a ROM 22, a RAM 23, and an EEPROM 24. The CPU 21, the ROM 22, the RAM 23, and the EEPROM 24 may be connected to the printer 2, the scanner 3, a network control unit ("NCU"), a modem 32, the operation keys 40, the LCD 41, the USB terminal 71, the slot section 72, an amplifier 73, and a speaker 74 via the bus line 25.

The ROM 22 may be a non-rewritable memory configured to store various control programs and data tables, and the RAM 23 may be a rewritable memory configured to store various data. The RAM 23 may comprise an image memory 23A and a setting data storage area 23B. The image memory 23A is a memory for storing image data of a document read by the scanner 3. The EEPROM 24 may be memory on which storing contents freely may be written, and may hold the storing contents even when the MFD 1 does not receive power. The NCU 31 may be configured to perform operations, such as delivering dial signals to a telephone network (not shown) and responding to call signals from the telephone network. The modem 32 modulates and demodulates image data, and transmits the image data to an other-end facsimile apparatus (not shown). The modem 32 also transmits and receives various step signals for transmission control via the NCU 31. The USB terminal 71 may be a known circuit for transmitting data to and receiving data from a computer via an USB cable (not shown). The amplifier 73 may be a circuit for outputting sound via the speaker 74.

Figure 6:
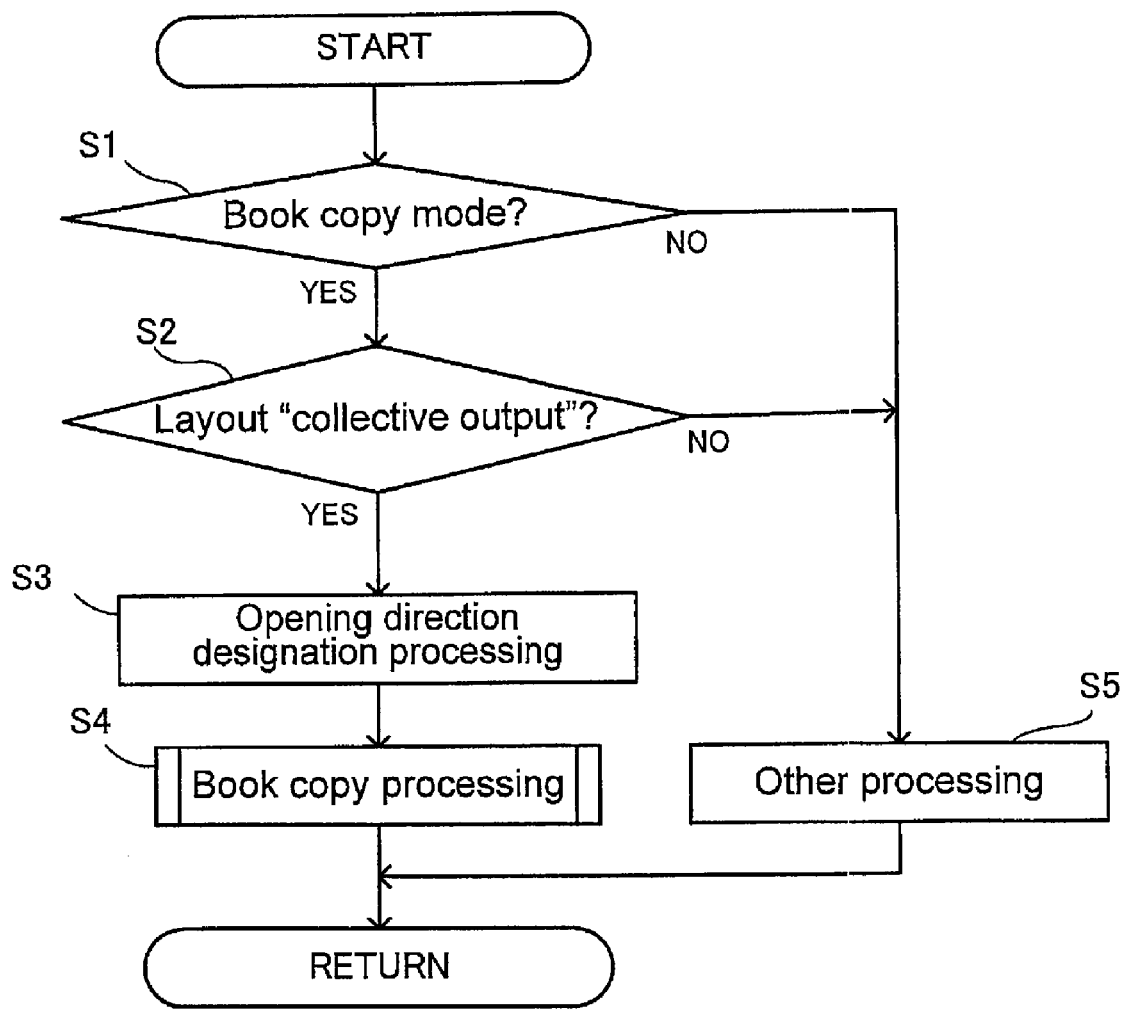
FIG. 6 is a flowchart of a main processing program, according to an embodiment of the present invention.

Referring to FIG. 6, a main processing program to be executed in the MFD 1, according to an embodiment of the present invention, is depicted. When execution of the main processing program begins, the CPU 21 determines whether a document copy mode has been selected. Specifically, the CPU 21 refers to the setting data storage area 23B and determines whether document copy setting data is stored therein. The document copy setting data is stored in the setting data storage area 23B based on a document copy setting operation performed by a user. When the document copy mode is selected (S1: YES), the process moves to S2. In contrast, when the document copy mode is not selected (S1: NO), the process moves to S5. For example, when a mode other than the document copy mode is selected, such as a facsimile function mode, the process moves to S5.

In S2, the CPU 21 refers to the setting data storage area 23B and determines whether layout setting "output" has been selected. The layout setting output is an output mode in which image data read from a plurality of documents are output and formed on a single recording medium 20. The CPU 21 performs the determination in S2 by referring to the output setting data in the setting data storage area 23B. When the layout setting output is selected (S2: YES), the process moves to S3. When the layout setting output is not selected (S2: NO), the process moves to S5.

In S3, the CPU 21 executes an opening direction designation processing program. In the opening direction designation processing program, the CPU 21 executes processing for storing opening direction designation data in the setting data storage area 23B based on the user's selection of the operation keys 40. The opening direction designation data indicates the opening direction of the open document G. After accepting the user's selections indicating the opening direction and storing the opening direction designation data, the process moves to S4.

In S4, the CPU 21 executes a document copy processing program. As such, the MFD 1 outputs image data read on a page basis from document pages of the open document G, and provides a readily viewable output in which images based on image data of the open document G are adjusted at proper positions to the user. After completing the document copy processing program (S4), the CPU 21 ends the main processing program.

In S5, the CPU 21 executes the non-document copy processing program which was selected by the user, e.g., a facsimile process. In S5, the CPU 21 also executes copy processing for outputting image data read from each document page of the open document G onto each recording medium 20. After completing the non-document copy processing program (S5), the CPU 21 ends the main processing program.

Figure 7:
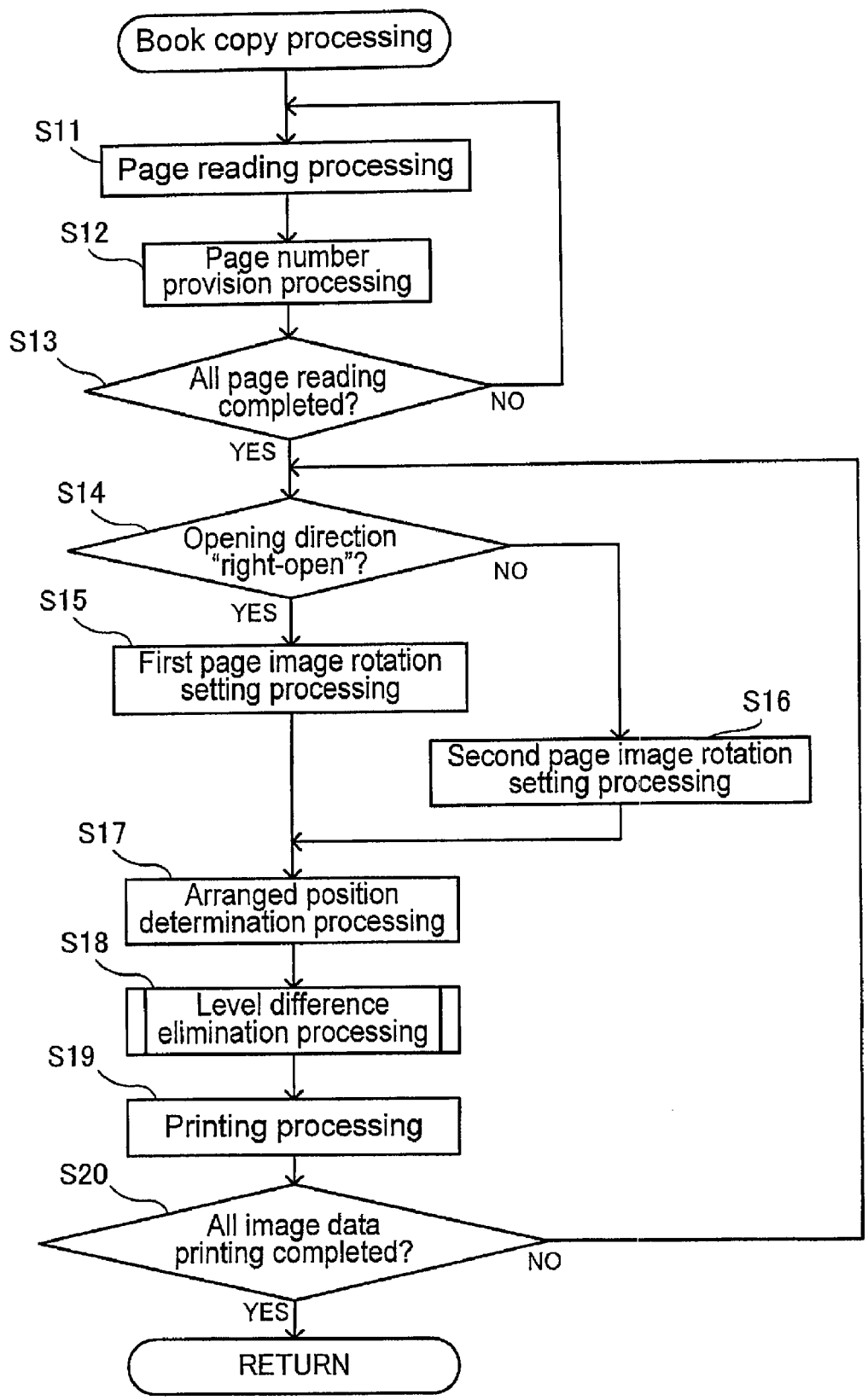
FIG. 7 is a flowchart of a copy processing program, according to an embodiment of the present invention.

Referring to FIG. 7, a flowchart of the document copy processing program (S4) is depicted. When beginning the document copy processing program, the CPU 21 first executes page reading processing (S11). In the page reading processing (S11), the CPU 21 reads an image of a first document page of the open document G via the scanner 3, and stores the image data associated with the first document page in the image memory 23A. After storing the image data associated with the first document page in the image memory 23A, the process moves to S12.

In S12, the CPU 21 executes page number provision processing. In the page number provision processing (S12), the CPU 21 associates image data acquired through the page reading processing (S11) and stored in the image memory 23A with page number data, and stores the page number data in the RAM 23. After storing the page number data in the RAM 23, the process moves to S13.

In S13, the CPU 21 determines whether document pages of the open document G to be copied already have been completely read. The determination of S13 is made based on the user's selections of the operation keys 40. As such, the user may select the document pages in a desired range as objects to be copied. When all of the document pages to be copied have been read (S13: YES), the process moves to S14. In contrast, when all document pages to be copied have not yet been read (S13: NO), the CPU 21 returns the process to S11. As such, the user then may acquire the image data from the not yet read document pages.

Figure 5:
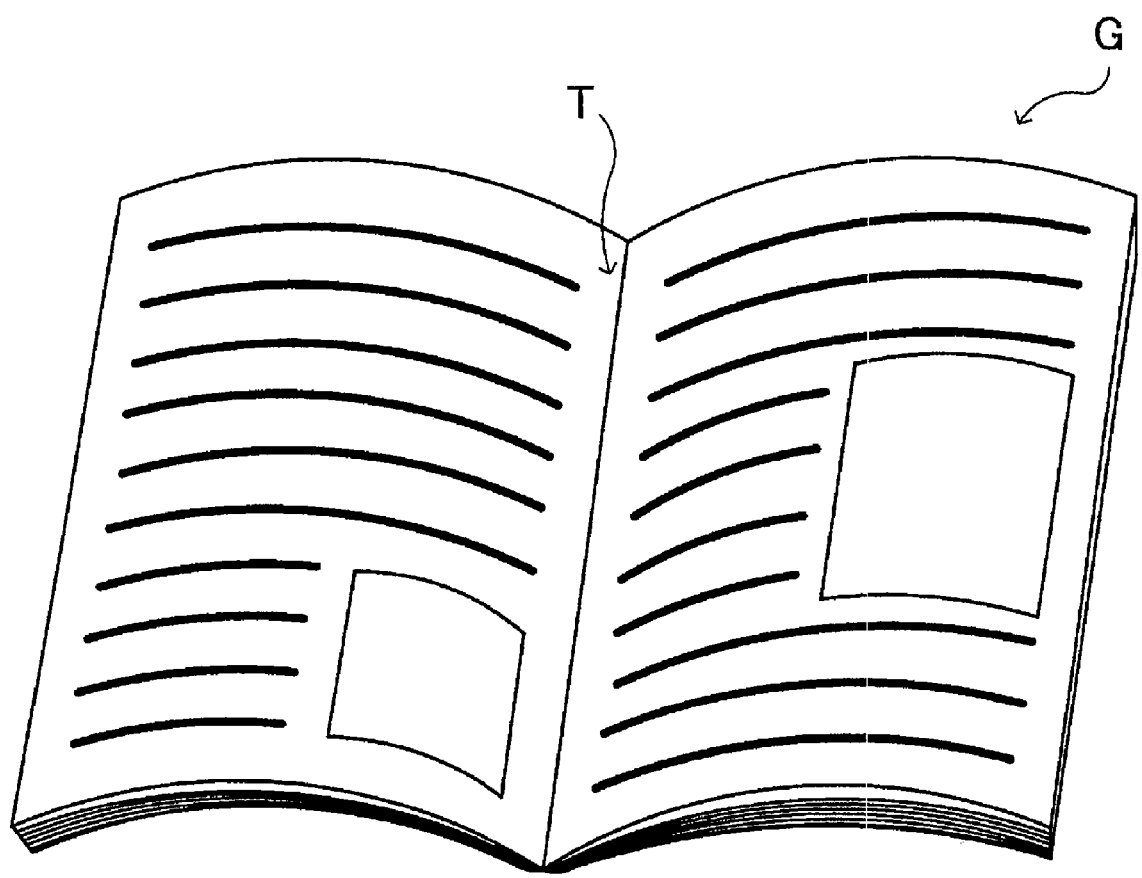
FIG. 5 is perspective view of an open document, according to an embodiment of the present invention.

Referring to FIG. 5, when the open document G is in an open state, the open document G may comprise two pages. A first page, e.g., a left side page, may be positioned on a first, e.g., a left, side of a binding portion T, and a second page, e.g., a right side page, may positioned on a second, e.g., a right, side of the binding portion T. Therefore, a document page having an odd page number and a document page having an even page number serial to the odd page number are adjacent to each other. In this embodiment, the pages positioned to the left of the binding portion T are defined as left document pages, and the pages positioned to the right of the binding portion T are defined as right document pages. The image data acquisition and the page number data provision (S11-S13) are executed in the order of the page number of each document page of the open document G.

In this embodiment, image data stored in the image memory 23A are classified into either first page image data 50 or second page image data 60. The first page image data 50 is image data associated with odd page number data through the page number provision processing (S12), and corresponds to image data of a document page instructed by a user to be read odd-number-th among a plurality of document pages read after the document copy mode was selected. The second page image data 60 is image data associated with even page number data through the page number provision processing (S12), and corresponds to image data of a document page instructed by a user to be read even-number-th among the plurality of document pages read. Therefore, the image data read from a document page having an odd page number in the open state of the open document G does not always comprise odd page number data. In other words, even or odd page number data is provided in S12 based on the order of document page reading by a user. When the layout setting "output" is selected by a user, the first page image data 50 and the second page image data 60 are outputted and formed on a single recording medium 20 by pairing the first page image data 50 and the second page image data 60.

Figure 8A:
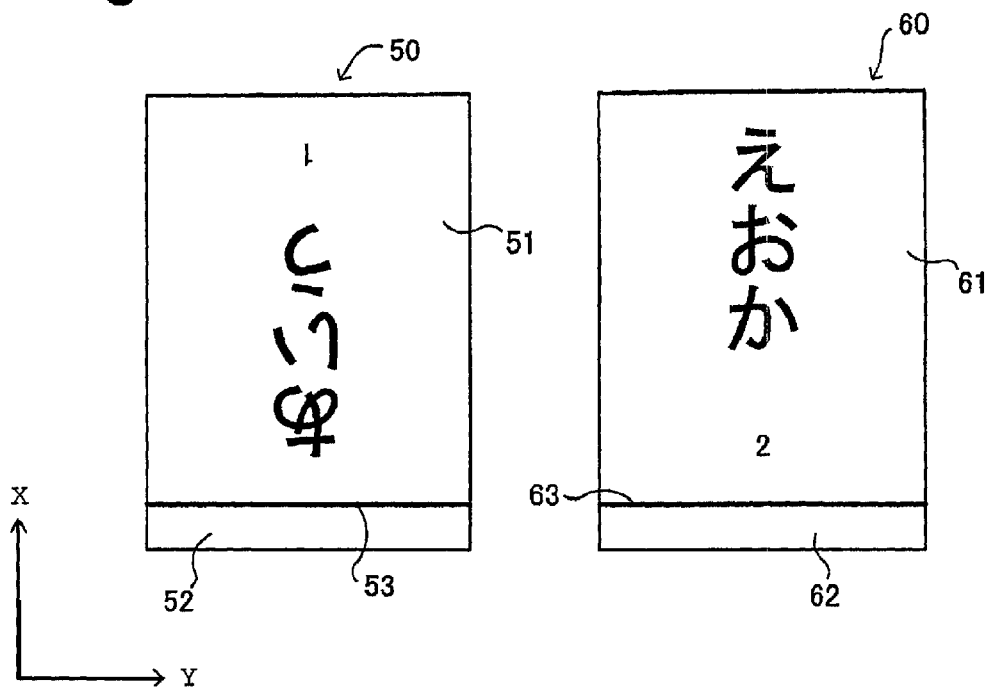
FIGS. 8(A) and 8(B) are views depicting first page image data and second page image data, respectively, according to an embodiment of the present invention.
Figure 8B:
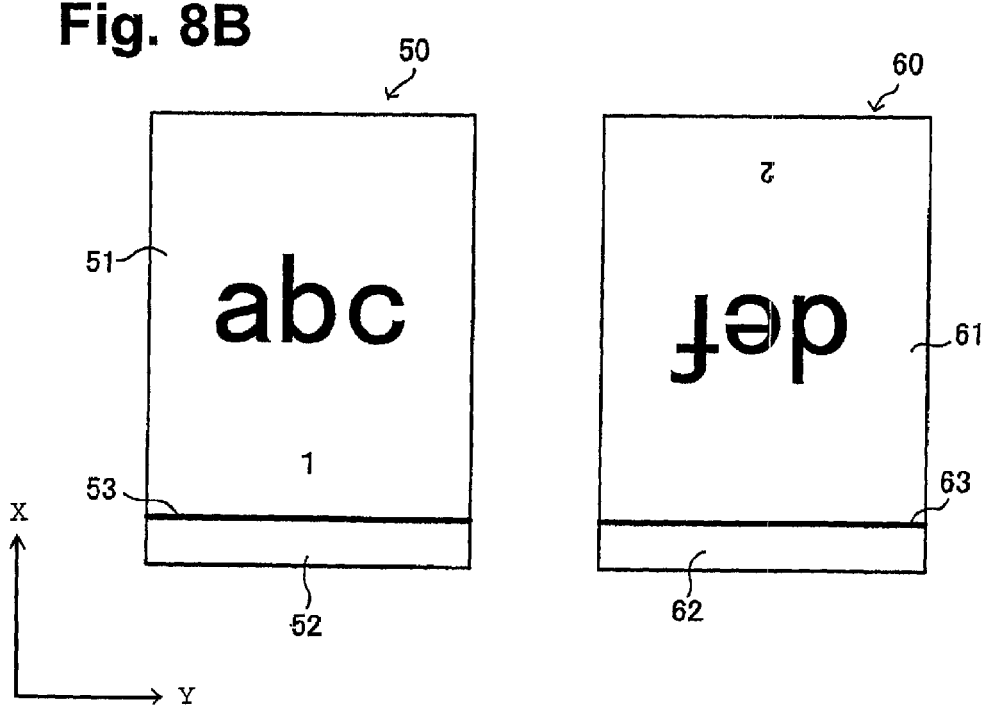

Referring to FIGS. 8(A) and 8(B), the first page image data 50 may comprise a first document page image region 51, a first page white blank region 52, and a first page edge 53. The first document page image region 51 is a region in which image data is arranged in the first page image data 50 based on a document page. The first page white blank region 52 is a region in which image data comprising white pixels is arranged in the first page image data 50 based on a portion of the document page. The first page edge 53 is image data based on a shadow portion generated based on the thickness of the document page at the border of the document page in the first page image data 50, and comprises black pixels.

The second page image data 60 may comprise a second document page image region 61, a second page white blank region 62, and a second page edge 63. The second document page image region 61 is a region in which image data is arranged in the second page image data 60 based on a document page. The second page white blank region 62 is a region in which image data comprising white pixels is arranged in the second page image data 60 based on a portion of the document page. In the second page image data 60, the second page edge 63 is image data based on a shadow portion generated based on the thickness of the document page at the border of the document page, and comprises black pixels. The first page white blank region 52 and the second page white blank region 62 may be generated when the size of the document page of the open document is less than the reading range of the scanner 3. Therefore, the smaller the size of the document page relative to the reading range of the scanner 3, the larger the first page white blank region 52 and the second page white blank region 62.

Referring to FIG. 5, the open document G is formed by binding a plurality of document pages at the binding portion T. Therefore, a user must alter the orientation of the open document G with respect to the scanner 3 between the page reading processing for a document page positioned on the right of the binding portion T and the page reading processing for a document page positioned on the left of the binding portion T. For example, when page reading processing is performed by positioning an open document G on the platen glass 12, such that the shorter side of the platen glass 12, e.g., the main scanning direction of the image reading unit 3A, and the shorter side of the document page coincide with each other, and the binding portion T coincides with the sub-scanning direction of the image reading unit 3A, the user executes page reading processing for the document page positioned on the first side of the binding portion T, and then the user rotates the open document G by 180 degrees and executes the page reading processing for the document page positioned on the second side of the binding portion T. The reason for this is that when the open document G is arranged on the platen glass 12 on a page basis, the document cover 8 is attached via hinges, such that the arrangement direction of the open document G is limited. As described above, the scanner 3 reads image data while moving the image reading unit 3A in the sub-scanning direction X. Therefore, either the first page image data 50 or the second page image data 60 may comprise an image associated with the document page which was rotated 180 degrees.

Depending on whether the open document G to be copied is a right-open type or a left-open type, the compositions of the first page image data 50 and the second page image data 60 differ. As shown in FIG. 8(A), when the open document G is a right-open type, in the first page image data 50, the first document page image is in a state in which the lower side in the first page image data 50 and the upper side of the first document page image coincide with each other, e.g., the first document page image is rotated by 180 degrees. In contrast, in the second page image data 60, the second document page image is in a state in which the upper side in the second page image data 60 and the upper side of the second document page image coincide with each other.

As shown in FIG. 8(B), when the open document G is left-open type, in the first page image data 50, the first document page image is in a state in which the upper side in the first page image data 50 and the upper side of the first document page image coincide with each other. In contrast, in the second page image data 60, the second document page image is in a state in which the lower side in the second page image data 60 and the upper side of the second document page image coincide with each other, e.g., the second document page image is rotated by 180 degrees.

As such, when the process moves to S14, the first page image data 50 and the second page image data 60 are associated with page number data stored in the RAM 23 through the page number provision processing (S12), and are stored in the image memory 23A.

In S14, the CPU 21 refers to the opening direction designation data of the setting data storage area 23B to determine whether the opening direction right-open type has been selected. When opening direction right-open type has been selected (S14: YES), the process moves to first page image rotation setting processing (S15). In contrast, when the opening direction left-open type has been selected (S14: NO), the process moves to second page image rotation setting processing (S16).

Figure 18A:
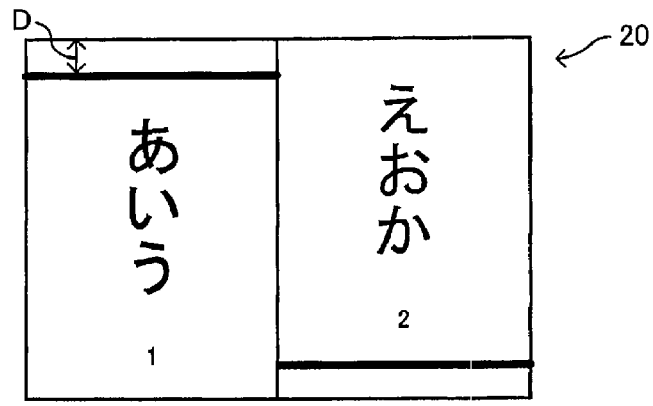
FIGS. 18(A)-18(D) are views depicting outputs of a right-open type open document, according to an embodiment of the present invention.
Figure 18B:
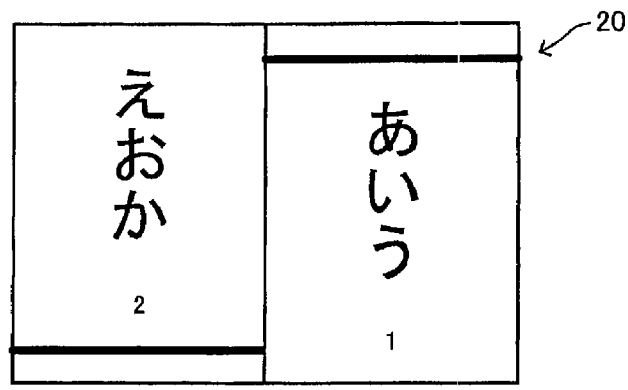
Figure 18C:
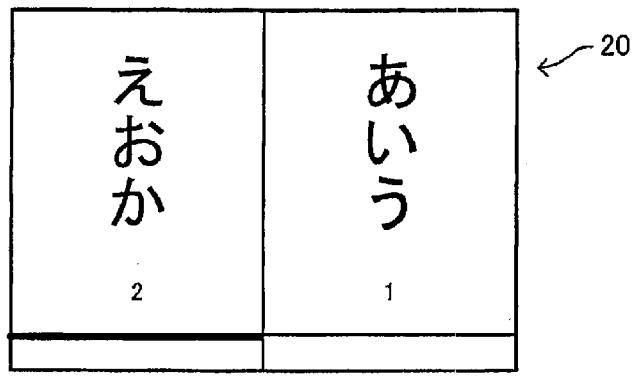
Figure 18D:
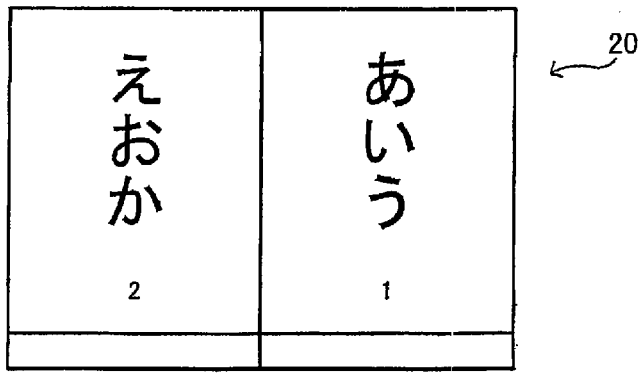

In S15, the CPU 21 executes the first page image rotation setting processing. In the first page image rotation setting processing (S15), the CPU 21 performs image editing to rotate the first page image data 50 stored in the image memory 23A by 180 degrees. As such, the entire first page image data based on the right-open type open document G is rotated by 180 degrees, such that the orientation of the first page image is altered to a correct orientation. Therefore, the orientations of the first page image and the second page image in the right-open type open document G are the same, as shown in FIG. 18(A). After completing the first page image rotation setting processing (S15), the process moves to S17.

Figure 17A:
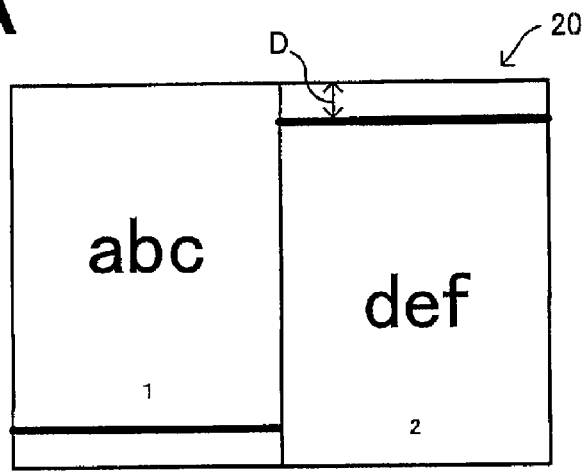
FIGS. 17(A)-17(C) are views depicting outputs of a left-open type open document, according to an embodiment of the present invention.
Figure 17B:
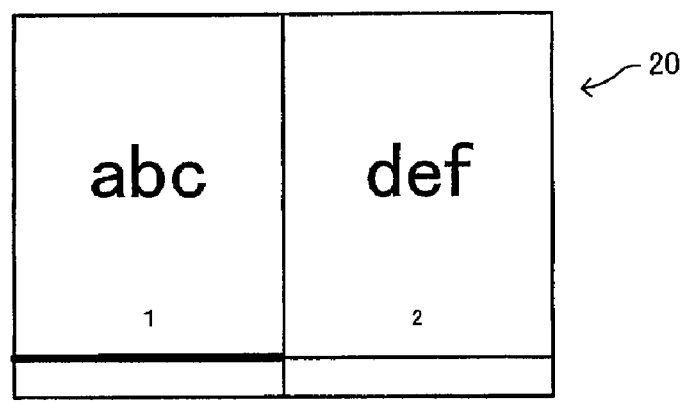
Figure 17C:
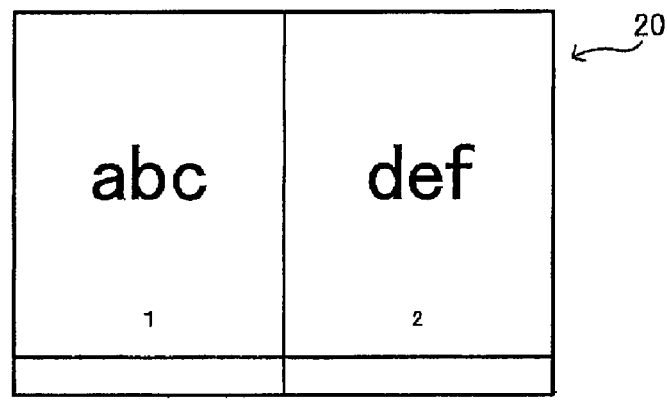

In contrast, in S16, the CPU 21 executes the second page image rotation setting processing. In the second page image rotation setting processing (S16), the CPU 21 performs image editing to rotate the second page image data 60 stored in the image memory 23A by 180 degrees. As such, the entire second page image data 60 based on the left-open type open document G is rotated by 180 degrees, such that the orientation of the second page image is altered to a correct orientation. Therefore, the orientations of the first page image and the second page image in the left-open type open document G are the same, as shown in FIG. 17(A). After completing the second page image rotation setting processing (S16), the process moves to S17.

In S17, the CPU 21 executes arranged position determination processing. In the arranged position determination processing (S17), the CPU 21 determines the arrangement of the first page image data 50 and the second page image data 60 to be recorded a recording medium 20 based on the designation of the opening direction by referring to the opening direction designation data of the setting data storage area 23B. In detail, when the opening direction left-open type is designated, the CPU 21 adjusts the arranged positions, such that the second page image is arranged to the right of the first page image on the recording medium 20. In contrast, when the opening direction right-open type is designated, the CPU 21 adjusts the arranged positions, such that the second page image is arranged on the left of the first page image on the recording medium 20. After determining the arrangement of the first page image data 50 and the second page image data 60 to be recorded on the recording medium 20, the process moves to S18.

In general, the left-open type open document G is formed, such that it is read from the left document page to the right document page with respect to the binding portion T. In contrast, the right-open type open document G is formed, such that it is read from the right document page to the left document page with respect to the binding portion T. By executing arranged position determination processing (S17), an output based on the open document G is altered to an arrangement corresponding to the opening direction of the open document G. Therefore, the MFD 1 may output respective document page image data by arranging these in the mode corresponding to the opening direction of the open document G, such that the MFD 1 may provide a readily readable output to the user.

In S18, the CPU 21 executes level difference elimination processing. When image data read on a document page basis comprises images corresponding to blank portions of the document, and image data based on the left or the right document page is rotated by 180 degrees, the position of the corresponding blank portion is different between the left page and the right page with respect to the binding portion T of the open document. As a result, in an output based on the open document, a level difference occurs between the right document page and the left document page, such that the output is difficult to read. Therefore, in the level difference elimination processing (S18), the CPU 21 identifies a first page white blank region 52 and a second page white blank region 62 present in the first page image data 50 and the second page image data 60, respectively, and excludes these from the output object based on the open document G. After completing the level difference elimination processing (S18), the process moves to S19.

As described above, in S15 and S16, either the first page image data 50 or the second page image data 60 is rotated by 180 degrees. Then, the position of the first page white blank region 52 in the first page image data 50 and the position of the second page white blank region 62 in the second page image data 60 are separated to the upper portion and the lower portion in each page image data. As a result, a deviation occurs between the position in the up and down direction of the first page image in the first page image data 50 and the position in the up and down direction of the second page image in the second page image data 60. The deviation in the up and down direction between the document page images caused by rotating either one of the two page image data having white blank regions at the same position by 180 degrees is referred to as a level difference D.

In the level-difference elimination processing (S18), when the first page white blank region 52 in the first page image data 50 and the second page white blank region 62 in the second page image data 60 are excluded from the output object, the first document page image region 51 in the first page image data 50 and the second document page image region 61 in the second page image data 60 are outputted at the same position in the up and down direction of the recording medium 20. As such, the MFD 1 eliminates the level difference D between the first document page image and the second document page image at the time of outputting, and provides a readily viewable output to the user.

After completing the level difference elimination processing (S18), the CPU 21 executes printing processing. In the printing processing (S19), the CPU 21 outputs the first document page and the second document page of the open document G onto the recording medium 20 based on the setting contents through the processing of S15-S18 and the contents of the first page image data 50 and the second page image data 60. After outputting the first page image data 50 and the second page image data 60 onto a single recording medium 20, the process moves to S20.

In S20, the CPU 21 determines whether all of the image data stored in the image memory 23A has been outputted onto the recording medium 20 by referring to the image memory 23A. When all of the image data in the image memory 23A has been outputted to recording medium 20 (S20: YES), the CPU 21 ends the document copy processing program. In contrast, when all of the image data has not yet been outputted (S20: NO), the CPU 21 returns the process to S14, and the CPU 21 may output the remaining image data onto recording medium 20.

Figure 9:
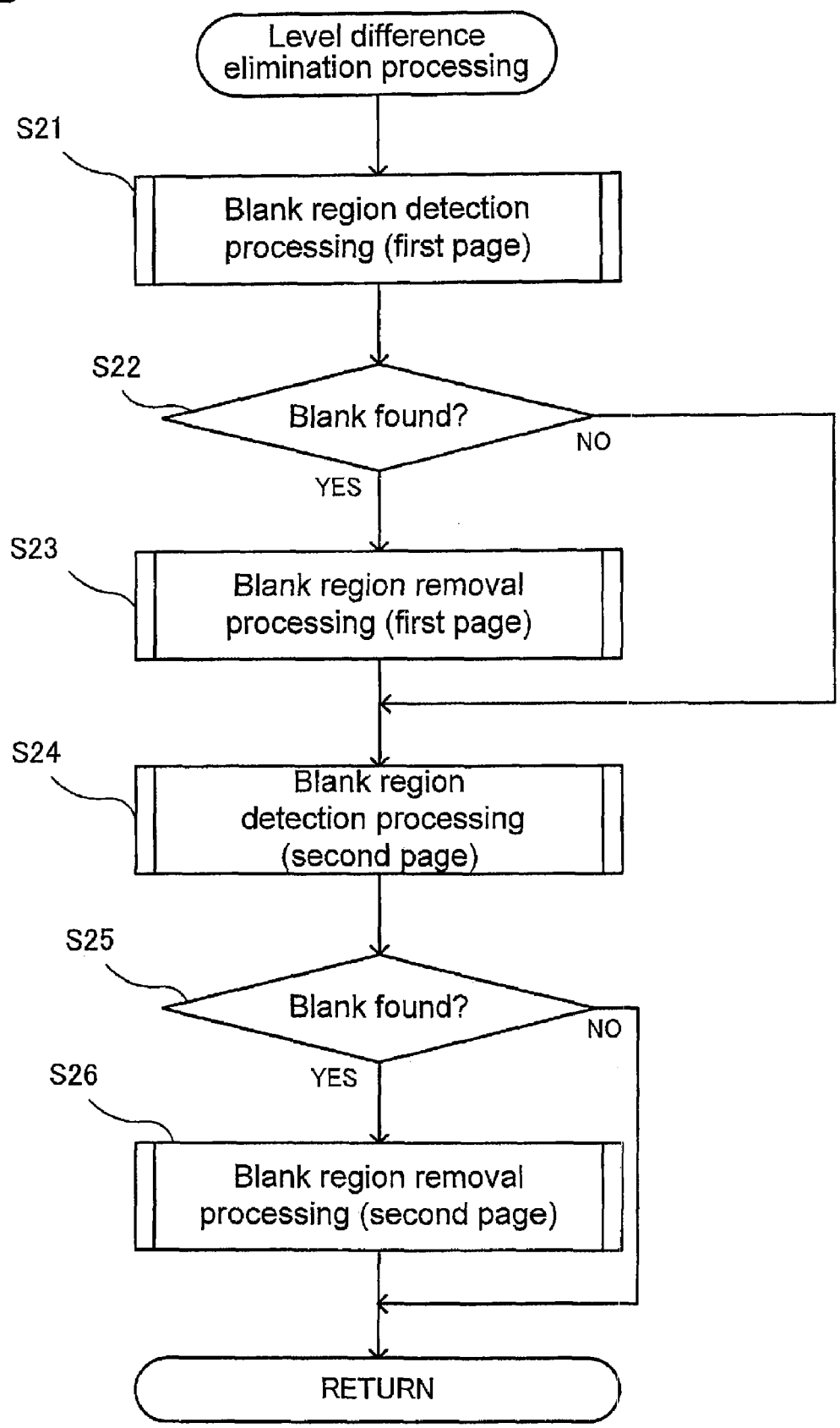
FIG. 9 is a flowchart of a level difference elimination processing program, according to an embodiment of the present invention.

Referring to FIG. 9, a flowchart of the level difference elimination processing program (S18) is depicted. When beginning execution of the level difference elimination processing program, the CPU 21 first executes blank region detection processing for the first page image data 50 (S21). In the blank region detection processing (S21), the CPU 21 executes a blank region detection processing program by selecting the first page image data 50 as a processing object. By executing the blank region detection processing program, the CPU 21 detects the first page white blank region 52 in the first page image data 50 (S21), and the process then moves to S22.

In S22, the CPU 21 determines whether the first page white blank region 52 is present in the first page image data 50 through the blank region detection processing (S21). In detail, the CPU 21 determines whether a "blank flag," e.g., an upper blank flag or a lower blank flag, related to the first page image data 50 is ON. When the blank flag is ON (S22: YES), the process moves to S23. When the blank flag is OFF and a "no-blank flag" is ON (S23: NO), the process moves to S24.

In S23, the CPU 21 executes the blank region removal processing for the first page image data 50 as a processing object. In the blank region removal processing (S23), the CPU 21 executes a blank region removal processing program. As such, the CPU 21 excludes the first page white blank region 52 detected through the blank region detection processing (S21) from the output object in the first page image data 50 (S23), and the process moves to S24.

In S24, the blank region detection processing for the second page image data 60 is executed. In the blank region detection processing (S24), the CPU 21 executes the blank region detection processing program for the second page image data 60 as a processing object. By executing the blank region detection processing program, the CPU 21 detects the second page white blank region 62 in the second page image data 60 (S24), and the process moves to S25.

In S25, the CPU 21 determines whether the second page white blank region 62 is present in the second page image data 60 through the blank region detection processing (S24). In detail, the CPU 21 determines whether a blank flag, e.g., an upper blank flag or a lower blank flag, related to the second page image data 60 is ON. When the blank flag is ON (S25: YES), the process moves to S26. In contrast, when the blank flag is OFF and a no-blank flag is ON (S25: NO), the CPU 21 ends the level difference elimination processing program.

In S26, the CPU 21 executes blank region removal processing for the second page image data 60 as a processing object. In the blank region removal processing (S26), the CPU 21 executes a blank region removal processing program. As such, the CPU 21 excludes the second page white blank region 62 detected through the blank region detection processing (S24) from the output object in the second page image data 60 (S26). After completing the execution of the blank region removal processing program, the CPU 21 ends the level difference elimination processing program.

Figure 10:
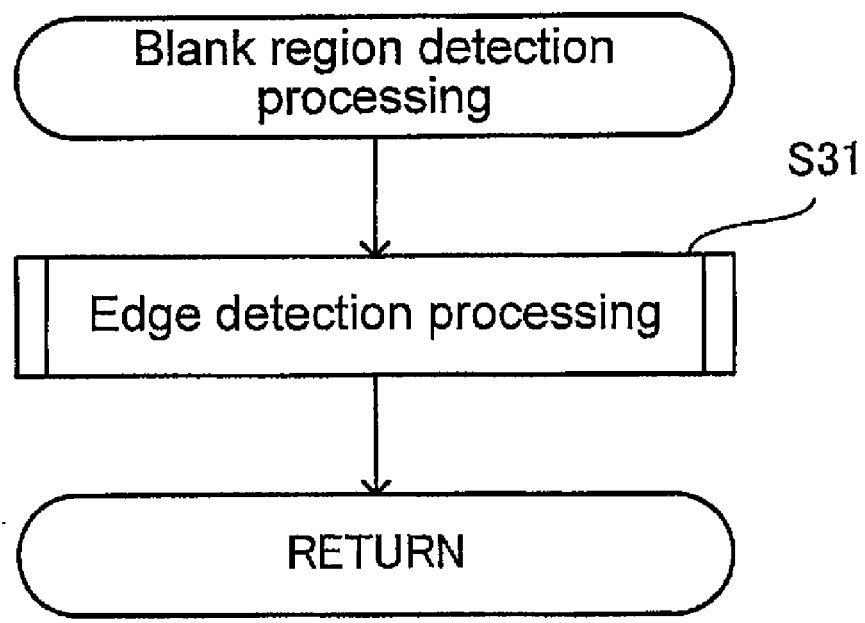
FIG. 10 is a flowchart of a blank region detection processing program, according to an embodiment of the present invention.

Referring to FIG. 10, a flowchart of the blank region detection processing program (S21 and S24), according to an embodiment of the present invention, is depicted. When beginning execution of the blank region detection processing program, the CPU 21 of the MFD 1 executes edge detection processing (S31). In the edge detection processing (S31), the CPU 21 executes an edge detection processing program. By executing the edge detection processing program, the CPU 21 detects a first page edge 53 in the first page image data 50 and a second page edge 63 in the second page image data 60. After completing execution of the edge detection processing program, the CPU 21 ends the blank region detection processing program.

Figure 11:
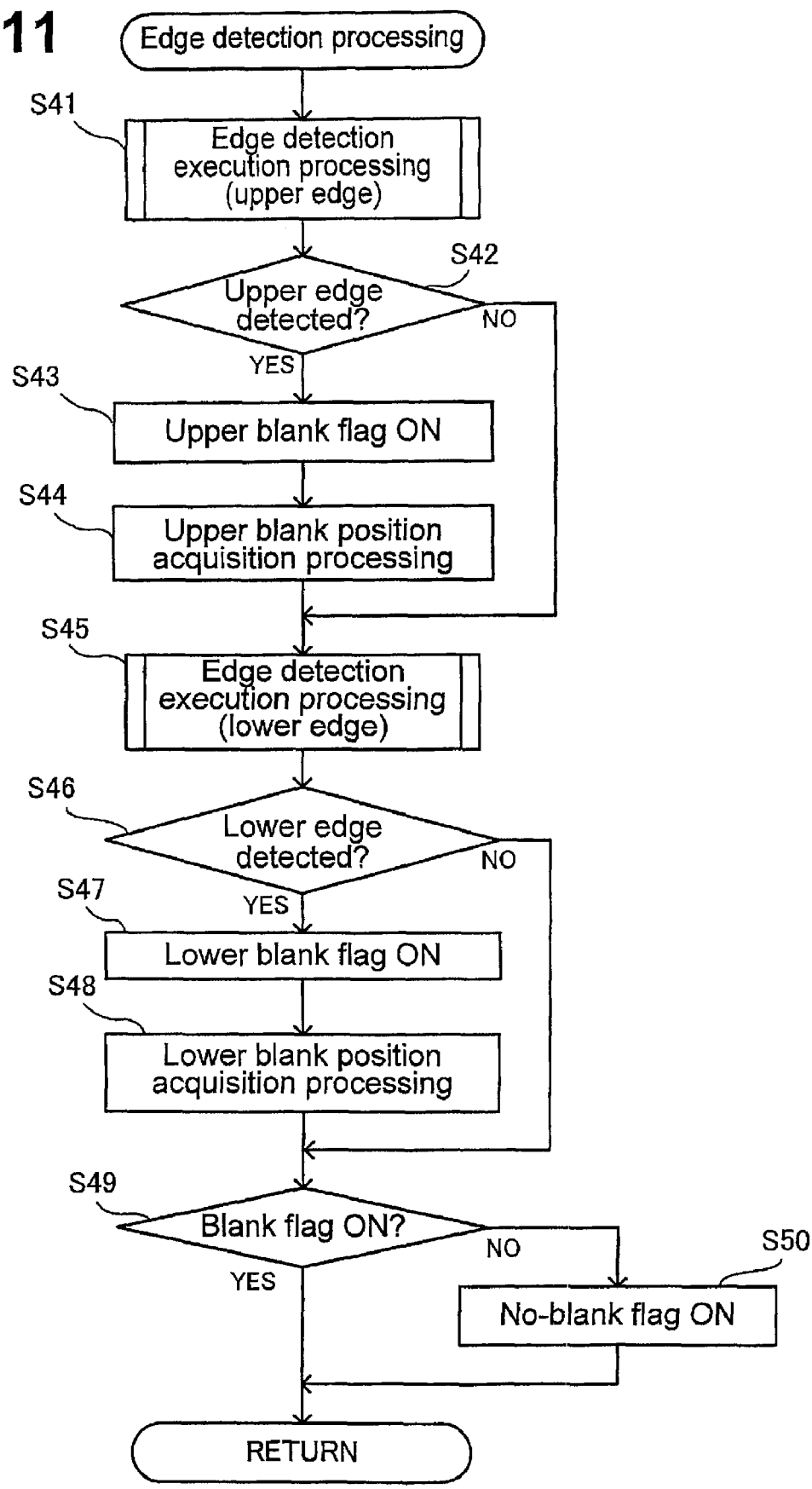
FIG. 11 is a flowchart of an edge detection processing program, according to an embodiment of the present invention.

Referring to FIG. 11, a flowchart of the edge detection processing program (S31) is depicted. When beginning execution of the edge detection processing program in S31, the CPU 21 first executes edge detection execution processing (S41). In the edge detection execution processing (S41), the CPU 21 executes an edge detection execution processing program. Through the edge detection execution processing program, by detecting blank pixels of an edge in an upper edge portion of object page image data as a processing object, e.g., the first page image data 50 or the second page image data 60, on a line basis, the CPU 21 detects the upper edge in the object page image data. After completing execution of the edge detection execution processing program, the process moves to S42.

In S42, the CPU 21 determines the presence of an upper edge in object page image data based on the detection result of the edge detection execution processing (S41). When an upper edge is detected (S42: YES), the CPU 21 turns an upper blank flag of the object page image data ON (S43). The upper blank flag is a flag indicating that a blank is present in the upper portion of the object page image data. After turning the upper blank flag ON, the process moves to S44. In contrast, when no upper edge is detected (S42: NO), the process moves to S45.

When turning the upper blank flag ON, the CPU 21 executes upper blank position acquisition processing in S44. In the upper blank position acquisition processing (S44), the CPU 21 acquires an upper blank position based on the position of the upper edge, e.g., the first page edge 53 or the second page edge 63, in the object page image data and stores it in the RAM 23. The upper blank position may be determined based on a minimum number of pixels corresponding to the distance from the upper end of the object page image data to the upper edge. After storing the acquired upper blank position in the RAM 23, the process moves to S45.

In S45, the CPU 21 executes the edge detection execution processing. In the edge detection execution processing (S45), the CPU 21 executes the edge detection execution processing program. By detecting black pixels of an edge, e.g., a lower edge, in the lower portion of the object page image data on a line basis through the edge detection execution processing program, the CPU 21 detects the lower edge in the object page image data. After completing execution of the edge detection execution processing program, the process moves to S46.

In S46, the CPU 21 determines the presence of a lower edge in the object page image data based on the detection result of the edge detection execution processing (S45). When a lower edge is detected (S46: YES), the CPU 21 turns a "lower blank flag" of the object page image data ON (S47). The lower blank flag is a flag indicating that a blank, e.g., the first page white blank region 52 or the second page white blank region 62, is present in the lower portion of the object page image data. After turning the lower blank flag ON, the process moves to S48. In contrast, when no lower edge is detected (S46: NO), the process moves to S49.

When turning the lower blank flag ON, the CPU 21 executes lower blank position acquisition processing in S48. In the lower blank position acquisition processing (S48), the CPU 21 acquires the lower blank position based on the position of the lower edge in the object page image data and stores it in the RAM 23. The lower blank position may be determined based on a minimum number of pixels corresponding to the distance from the lower end of the object page image data to the lower edge. After storing the acquired lower blank position in the RAM 23, the process moves to S49.

In S49, the CPU 21 determines whether a blank flag is ON by referring to the RAM 23. In other words, based on whether either the upper blank flag or the lower blank flag is ON, or both of these are OFF, the CPU 21 makes the determination of S49. When the blank flag is ON (S49: YES), the CPU 21 ends the edge detection processing program. In contrast, when the blank flag is not ON (S49: NO), the CPU 21 turns a no-blank flag indicating no presence of a blank, e.g., the first page white blank region 52 or the second page white blank region 62, in the object page image data ON (S50). The CPU 21 then ends the edge detection processing program.

Figure 12:
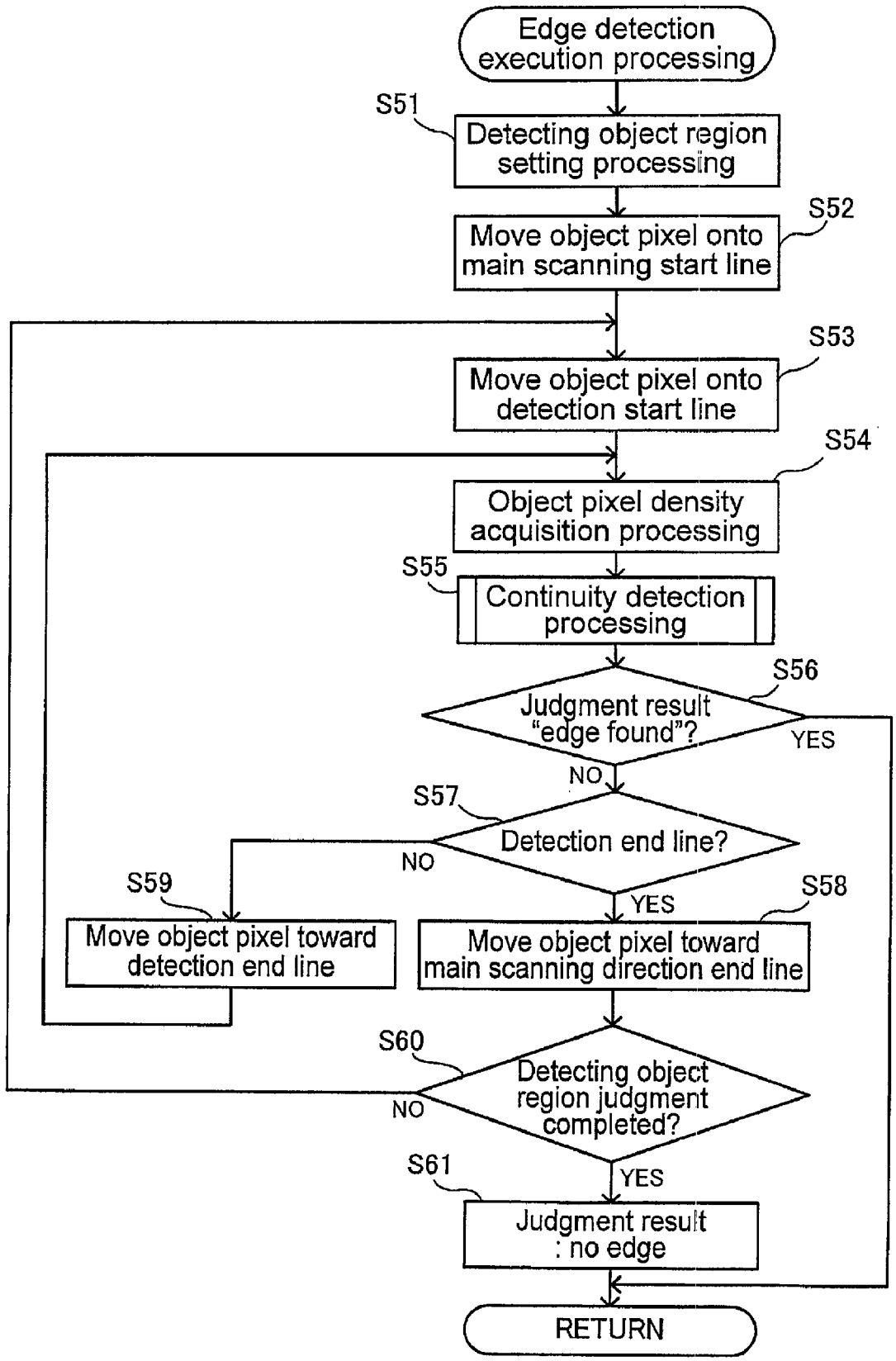
FIG. 12 is a flowchart of an edge detection execution processing program, according to an embodiment of the present invention.

Referring to FIG. 12, a flowchart of the edge detection execution processing program (S41 and S45) is depicted. In the edge detection execution processing (S41 or S45), the CPU 21 first executes detecting object region setting processing (S51). The detecting object region setting processing (S51) is a process for setting a region from which an edge, e.g., the first page edge 53 or the second page edge 63, is detected in the object page image data.

Referring to FIGS. 13 (A) and (B), detecting object regions selected in the detecting object region setting processing is depicted. As described above, in the edge detection processing program, the edge detection execution processing program is executed when detecting an upper edge (S41) and when detecting a lower edge (S45). Therefore, in the detecting object region setting processing (S51), the detecting object region is selected to a position different between upper edge detection and lower edge detection.

Figure 13A:
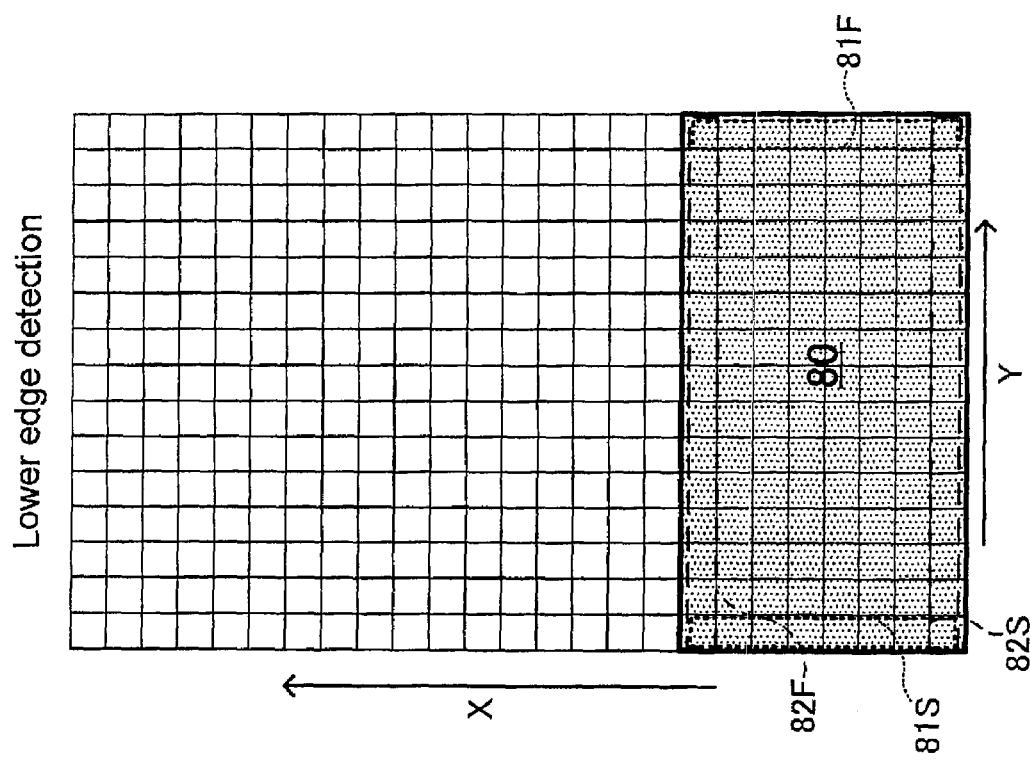
FIGS. 13(A) and 13(B) are views depicting the detection of object regions, according to an embodiment of the present invention.

As shown in FIG. 13(A), when detecting an upper edge, a detecting object region 80 is set to be a region corresponding to a plurality of lines of the upper portion of the object page image data. By setting the detecting object region 80, the CPU 21 identifies a main scanning direction start line 81S, a main scanning direction end line 81F, a detection start line 82S, and a detection end line 82F.

The main scanning direction start line 81S is the first detecting object line when detecting black pixels of an upper edge in the detecting object region 80, and is one line positioned at the left most end of the detecting object region 80. The main scanning direction end line 81F is the last detecting object line when detecting the black pixels of the upper edge in the detecting object region 80, and is one line positioned at the right most end of the detecting object region 80. The detection start line 82S is a line comprising pixels to be processed first when detecting the black pixels of the upper edge in the respective detecting object lines. Pixels to be processed will be referred to as "object pixels." In other words, as shown in FIG. 13(A), the detection start line 82S, when detecting an upper edge, is one line positioned at the upper end of the detecting object region 80. The detection end line 82F is a line comprising last object pixels when detecting black pixels of an upper edge in the respective detecting object lines. In other words, as shown in FIG. 13(A), the detection end line 82F, when detecting an upper edge, is one line positioned at the lower end of the detecting object region 80.

The distance, e.g., number of pixels, between the detection end line 82F and the detection start line 82S is selected in the MFD 1 in advance. The number of pixels of one line in the main scanning direction of the document page and the number of pixels of one line in the sub-scanning direction are determined based on the resolution when reading the document, such that the detection start line 82S is data corresponding to the number of pixels of one line in the main scanning direction when reading from the head of the image data read from the document page. The detection end line 82F corresponds to a line moved in the sub-scanning direction by a number of pixels selected in advance from the detection start line 82S, and also may be identified based on the number of pixels of one line in the main scanning direction and the distance between the detection end line 82F and the detection start line 82S. The main scanning direction start line 81S and the main scanning direction end line 81F also may be identified from image data read from the document page based on the number of pixels in the main scanning direction and the number of pixels in the sub-scanning direction of the document page.

Figure 13B:
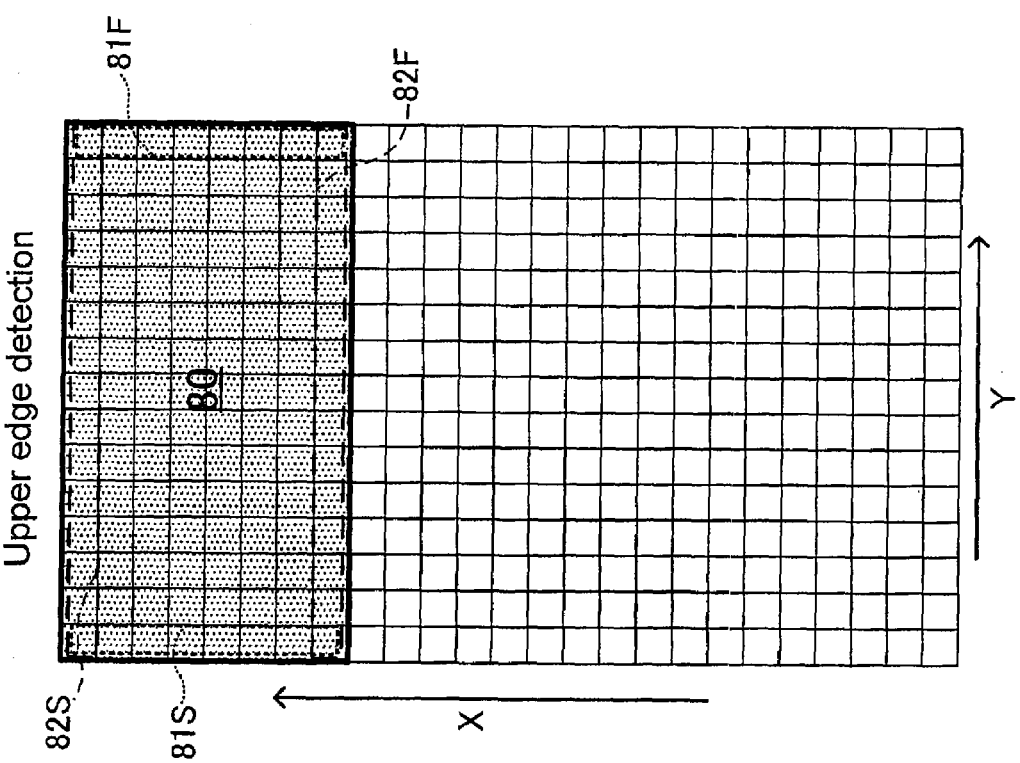

As shown in FIG. 13(B), when detecting a lower edge, the detecting object region 80 is set to be a region corresponding to a plurality of lines of the lower portion of the object page image data. By setting the detecting object region 80 in the same manner as with respect to the upper edge detection, the CPU 21 identifies a main scanning direction start line 81S, a main scanning direction end line 81F, a detection start line 82S, and a detection end line 82F.

The main scanning direction start line 81S is the first detecting object line when detecting black pixels of a lower edge in the detecting object region 80, and is one line positioned at the left most end of the detecting object region 80. The main scanning direction end line 81F is the last detecting object line when detecting the black pixels of the lower edge in the detecting object region 80, and is one line positioned at the right most end of the detecting object region 80. The detection start line 82S is a line comprising first object pixels when detecting black pixels of a lower edge in the respective detecting object lines. In other words, as shown in FIG. 13(B), the detection start line 82S, when detecting a lower edge, is one line positioned at the lower end of the detecting object region 80. The detection end line 82F is a line comprising the last object pixels when detecting the black pixels of the lower edge in the respective detecting object lines. In other words, the detection end line 82, when detecting a lower edge, is one line positioned at the upper end of the detecting object region 80. The methods for identifying the respective lines may be the same as with respect to the upper edge.

In the detecting object region setting processing (S51), the CPU 21 sets a detecting object region 80 at a predetermined position in the object page image data based on particular conditions, such as the time of upper edge detection or the time of the lower edge detection. Then, by setting the detecting object region 80, the CPU 21 identifies the main scanning direction start line 81S, the main scanning direction end line 81F, the detection start line 82S, and the detection end line 82F based on such conditions. The process then moves to S52.

In S52, the CPU 21 moves the object pixel onto the main scanning direction start line 81S. Then, in S53, the CPU 21 moves the object pixel onto the detection start line 82S. Therefore, when beginning the detection of black pixels, the object pixel is on the main scanning direction start line 81S and on the detection start line 82S. In other words, when starting detection of an upper edge, the object pixel moves to the pixel positioned at the upper left corner of the object page image data. When starting detection of a lower edge, the object pixel moves to the pixel positioned at the lower left corner of the object page image data.

In S54, the CPU 21 executes object pixel density acquisition processing. In the object pixel density acquisition processing (S54), the CPU 21 acquires density data of the current object pixel. The density data of the pixel may be acquired using a known acquisition method. After acquiring the density data of the object pixel, the process moves to continuity detection processing (S55).

In S55, the CPU 21 executes continuity detection processing. In the continuity detection processing (S55), the CPU 21 executes a continuity detection processing program to determine the presence of an edge in the detecting object region 80. After storing the determination with respect to the presence of an edge in the RAM 23, the process moves to S56.

In S56, the CPU 21 determines whether the determination of the continuity detection processing (S56) is "edge found" by referring to the RAM 23. When the determination is edge found (S56: YES), the CPU 21 ends the edge detection execution processing program. In contrast, when the determination is "no edge" (S56: NO), the process moves to S57.

In S57, the CPU 21 determines whether the current object pixel is a pixel of the detection end line 82F. In other words, in S57, the CPU 21 determines whether edge detection processing for one line in the vertical direction, e.g., the sub-scanning direction, of the detecting object region 80 has been completed. When the object pixel is a pixel of the detection end line 82F (S57: YES), the process moves to S58. When the object pixel is not a pixel of the detection end line 82F (S57: NO), the process moves to S59.

In S58, the CPU 21 moves the object pixel to the side of the main scanning direction end line 81F, e.g., to the right side of the object page image data in FIGS. 13(A) and 13 (B). In other words, the object pixel moves to the side of the main scanning direction end line 81F on the detection end line 82F.

In S59, the CPU 21 moves the object pixel to the side of the detection end line 82F. Specifically, the object pixel moves toward the lower side of the detecting object region 80 when detecting an upper edge, and moves toward the upper side of the detecting object region 80 when detecting a lower edge. Thereafter, the CPU 21 returns the process to the object pixel density acquisition processing (S54). When the processing of pixels up to the detection end line 82F has not yet been completed (S58: NO), the CPU 21 moves the object pixel to the side of the detection end line 82F and executes processing for the unprocessed pixels (S54-S57).

Then, in S60, the CPU 21 determines whether the determination of the presence of an edge has been completed for the entire detecting object region 80. When the determination has been completed for the entire detecting object region 80 (S60: YES), the process moves to S61. In contrast, when the determination has not yet been completed for the entire detecting object region 80 (S60: NO), the CPU 21 returns the process to S53. The CPU 21 makes the determination as to whether the determination about the presence of an edge has been completed for the entire detecting object region 80 based on the number of pixels of one line in the main scanning direction when reading the detecting object region 80. Therefore, the number of lines subjected to edge detection processing is counted from the main scanning direction start line 81S, and when the count reaches the number of pixels of one line in the main scanning direction, it is determined that the determination has been completed for the entire detecting object region 80.

In S61, the CPU 21 reaches the determination of no edge. In S61, the determination of the CPU 21 is not always the edge found (S57: NO). After reaching the determination of no edge, the CPU 21 ends the edge detection execution processing program.

Figure 14:
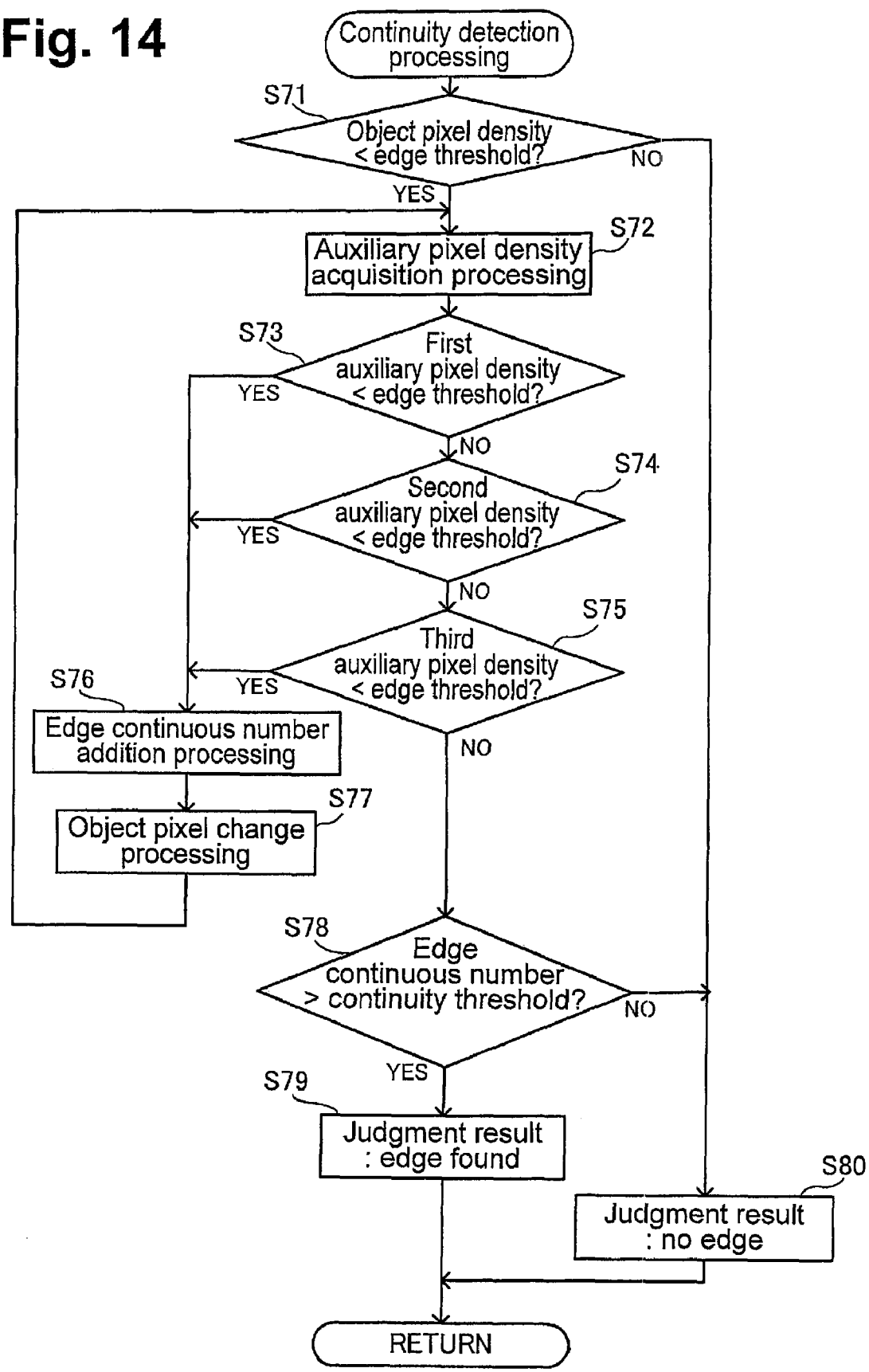
FIG. 14 is a flowchart of a continuity detection processing program, according to an embodiment of the present invention.

Referring to FIG. 14, a flowchart of the continuity detection processing program (S55) is depicted. In S55, the CPU 21 first reads density data of the object pixel acquired through the object pixel density acquisition processing (S54), and then determines whether the object pixel density is less than an edge threshold (S71). The edge threshold may be a density value used as a criterion for determining whether the pixel is a black pixel of the first page edge 53 or the second page edge 63. When the density value is less than the edge threshold, the object pixel is determined to be a black pixel of an edge, and when it is greater than or equal to the edge threshold, the object pixel is determined to not be a black pixel of an edge. When the object pixel density is less than the edge threshold (S71: YES), the CPU 21 adds "1" to an edge continuous number counter of the RAM 23, and further stores the position thereof, e.g., the distance or the number of pixels from the detection start line in the RAM 23, and then the process moves to S72. In contrast, when the object pixel density is greater than or equal to the edge threshold (S71: NO), the process moves to S80.

Figure 15:
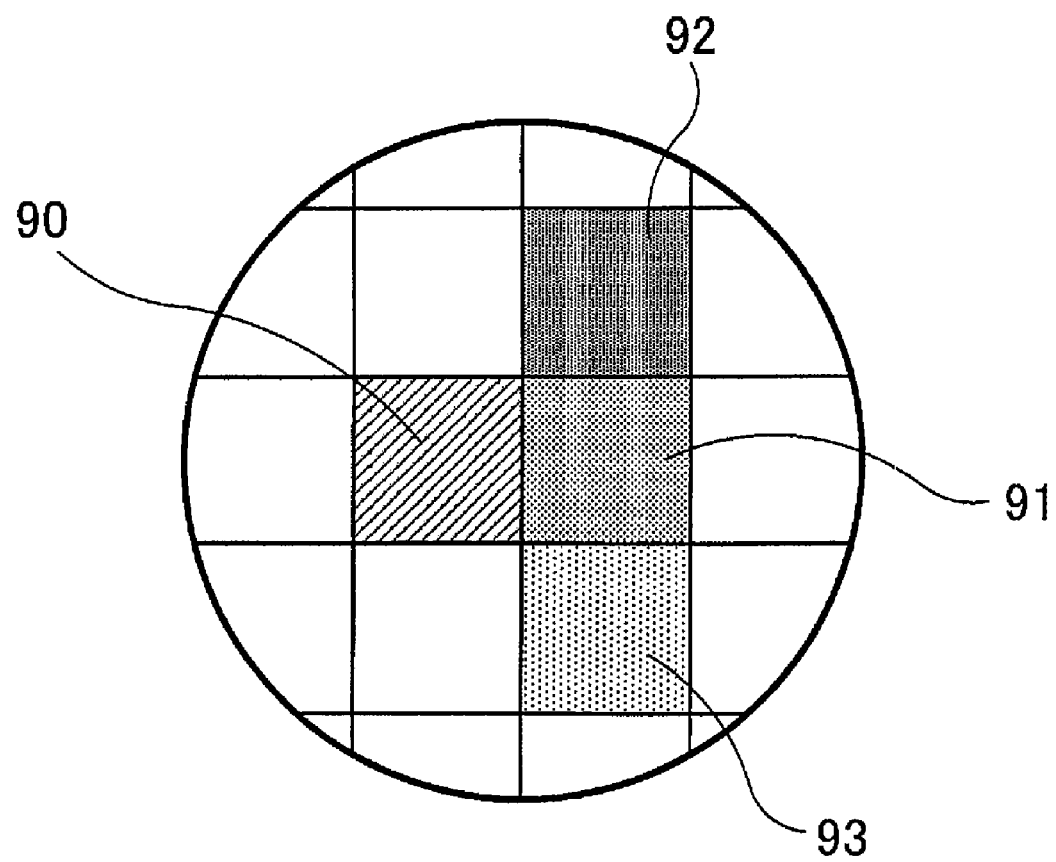
FIG. 15 is a view of an object pixel, a first auxiliary pixel, a second auxiliary pixel, and a third auxiliary pixel, according to an embodiment of the present invention.

In S72, the CPU 21 executes auxiliary pixel density acquisition processing. In the auxiliary pixel density acquisition processing (S72), the CPU 21 acquires densities of a first auxiliary pixel 91, a second auxiliary pixel 92, and a third auxiliary pixel 93 positioned adjacent to an object pixel 90. As shown in FIG. 15, the first auxiliary pixel 91 is a pixel on the immediate right, in the main scanning direction, of the object pixel 90, the second auxiliary pixel 92 is a pixel on the upper right of the object pixel 90, and the third auxiliary pixel 93 is a pixel on the lower right of the object pixel 90. After acquiring density data of the first auxiliary pixel 91, the second auxiliary pixel 92, and third auxiliary pixel 93, the process moves to S73.

In S73, the CPU 21 determines whether the pixel density of the first auxiliary pixel 91 is less than the edge threshold. When the pixel density of the first auxiliary pixel 91 is less than the edge threshold (S73: YES), the CPU 21 determines that the first auxiliary pixel 91 is a black pixel, and the process moves to edge continuous number addition processing (S76). In contrast, when the pixel density of the first auxiliary pixel 91 is greater than or equal to the edge threshold (S73: NO), the CPU 21 determines that the first auxiliary pixel 91 is not a black pixel, and the process moves to S74.

In S74, the CPU 21 determines whether the pixel density of the second auxiliary pixel 92 is less than the edge threshold. When the pixel density of the second auxiliary pixel 92 is less than the edge threshold (S74: YES), the CPU 21 determines that the second auxiliary pixel 92 is a black pixel, and the process moves to the edge continuous number addition processing (S76). In contrast, when the pixel density of the second auxiliary pixel 92 is greater than or equal to the edge threshold (S74: NO), the CPU 21 determines that the second auxiliary pixel 92 is not a black pixel, and the process moves to S75.

In S75, the CPU 21 determines whether the pixel density of the third auxiliary pixel 93 is less than the edge threshold. When the pixel density of the third auxiliary pixel 93 is less than the edge threshold (S75: YES), the CPU 21 determines that the third auxiliary pixel 93 is a black pixel, and the process moves to the edge continuous number addition processing (S76). In contrast, when the pixel density of the third auxiliary pixel 93 is greater than or equal to the edge threshold (S75: NO), the CPU 21 determines that the third auxiliary pixel 93 is not a black pixel, and the process moves to S78.

In S76, the CPU 21 executes edge continuous number addition processing. Specifically, the CPU 21 adds "1" to the value of the edge continuous number counter of the RAM 23. The number of the edge continuous number counter may indicate the number of pixels in a line in the main scanning direction with density values which are less than the edge threshold in the detecting object region 80. In other words, the value of the edge continuous number counter indicates the number of continuous pixel data in a line which were determined to be black pixels of an edge, e.g., the first page edge 53 or the second page edge 63, in the detection object region 80. At this time, when the distance, e.g., number of pixels, from the detection start line of the auxiliary pixel determined to be a black pixel is less than the distance, e.g., number of pixels, from the detection start line of the object pixel when the object pixel density previously stored in the RAM 23 was determined to be less than the edge threshold (S71: YES), the CPU 21 executes processing for updating the storing contents in the RAM 23 to the lesser distance in the processes S73-S75. For example, when the second auxiliary pixel 92 is determined to be a black pixel, the storing contents in the RAM 23 are updated, such that the updated storing contents correspond to the upper edge position. In detecting a lower edge, when the third auxiliary pixel 93 is determined to be a black pixel, the storing contents in the RAM 23 are updated, such that the updated storing contents correspond to the lower edge position. After completing the edge continuous number addition processing (S76), the process moves to S77.

In S77, the CPU 21 executes object pixel altering processing. In the object pixel altering processing (S77), the CPU 21 alters a pixel whose density was determined to be less than the edge threshold in S73-S75, e.g., any of auxiliary pixels 91-93, to a new object pixel 90. After completing the object pixel altering processing (S77), the CPU 21 returns the process to S72. As such, the CPU 21 acquires density values of the auxiliary pixels 91-93 positioned adjacent to the new object pixel 90. Therefore, the CPU 21 repeats the processes of S72-S77 as long as the auxiliary pixels 91-93 include a pixel whose density is less than the edge threshold.

In contrast, in S78, the CPU 21 reads a value of the edge continuous number counter of the RAM 23 and determines whether the edge continuous number is greater than a continuity threshold. The continuity threshold may be a value of the edge continuous number counter used as a criterion for determining the presence of an upper edge or a lower edge. When the edge continuous number is greater than the continuity threshold (S78: YES), the CPU 21 determines that an edge is present in the detecting object region 80, and stores "edge found" as a determination of the continuity detection processing in the RAM 23 (S79). After storing the determination of "edge found" in the RAM 23, the CPU 21 ends the continuity detection processing program. In contrast, when the edge continuous number is less than or equal to the continuity threshold (S78: NO), the CPU 21 stores "no edge" as a determination of the continuity detection processing in the RAM (S80). After storing the determination of "no edge" in the RAM 23, the CPU 21 ends the continuity detection processing program.

Therefore, in the continuity detection processing program, it is determined whether a pixel row of the main scanning direction start line 81S in the detecting object region 80 are black pixels in order from the upper end, e.g., the detection start line 82S side, to the detection end line 82F side. Then, when no black pixel is present on the main scanning direction start line 81S, the same determination is made for the next line, e.g., the adjacent line on the main scanning direction end line 81F side. Then, until a black pixel is detected, the processing is repeated while moving the processing object to the next line. Then, when a black pixel is detected in the line, the CPU stores the position thereof, e.g., the distance or the number of pixels from the detection start line, in the RAM 23, and subsequently, determines whether the auxiliary pixels adjacent to the detected black pixel are black pixels to detect whether the number of black pixels continuous in the main scanning direction in the image data of the document page is greater than or equal to a predetermined number of pixels.

When the adjacent auxiliary pixel is determined to be a black pixel, the CPU determines whether the position, e.g., the distance or the number of pixels from the detection start line, thereof is less than the position stored in the RAM 23, and stores the lesser position. Therefore, when black pixels continuous in the main scanning direction are present and an edge found (S79) is determined in the continuity detection processing program, the minimum value of the distance (number of pixels) from the detection start line of the edge comprising continuous black pixels is stored in the RAM 23. The edge is an upper edge, e.g., the first page edge 53 or the second page edge 63, and the minimum value stored in the RAM 23 is an upper blank position acquired in S44 of the edge detection processing. A lower edge may be processed in the same manner, and when a lower edge is detected in the image data of the document page, the minimum value of the positions of the black pixels of the lower edge is a lower blank position acquired in S48 of the edge detection processing.

Figure 16:
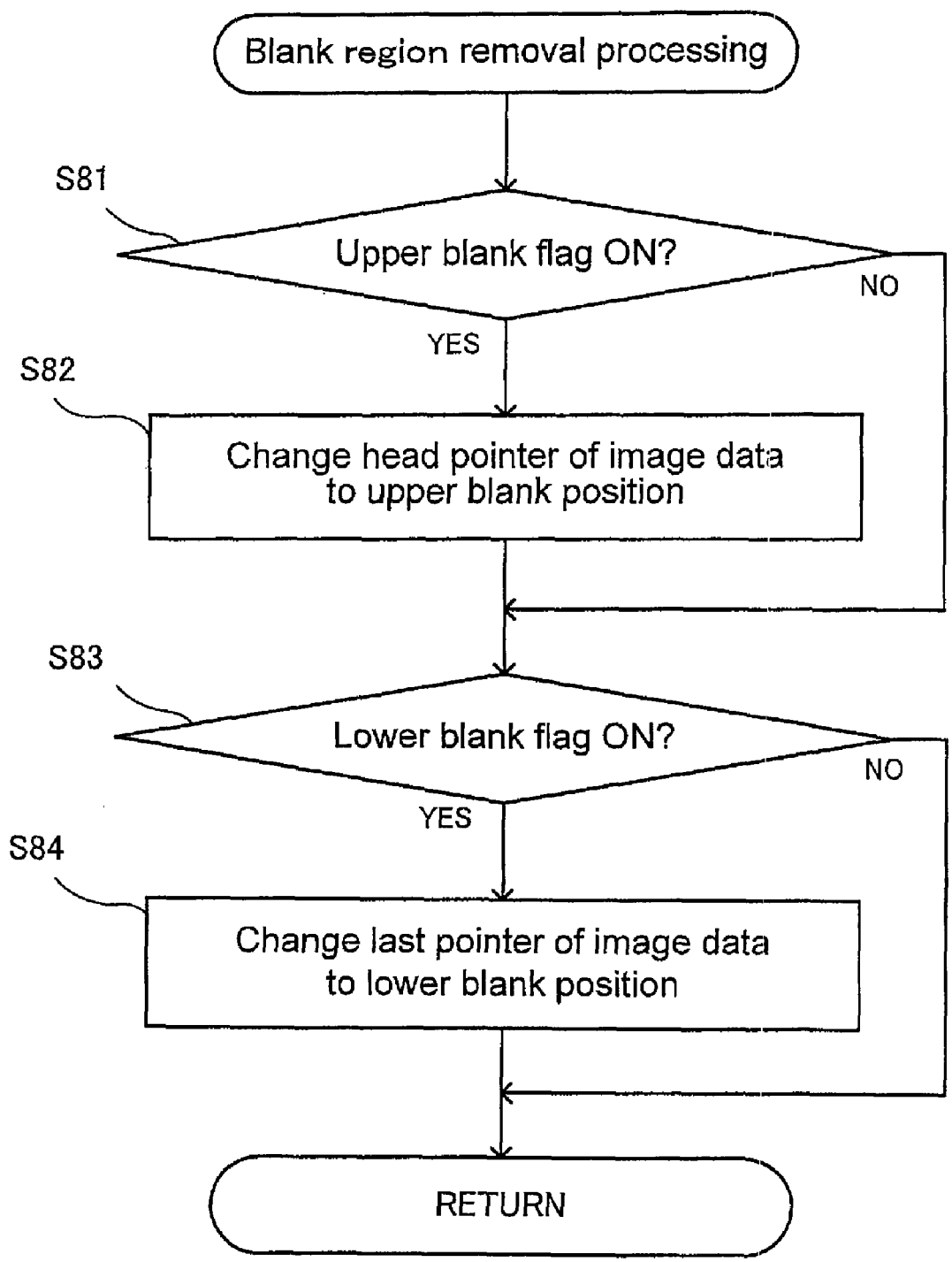
FIG. 16 is a flowchart of a blank region removal processing program, according to an embodiment of the present invention.

Referring to FIG. 16, a flowchart of the blank removal processing program (S23 and S26) is depicted. When beginning execution of the blank removal processing program, the CPU 21 determines whether the upper blank flag is ON first by referring to the RAM 23 (S81). The upper blank flag is a flag that is turned ON in S43 of the edge detection processing program, and indicates that an upper blank region is present in the object page image data. When the upper blank flag is ON (S81: YES), the process moves to S82. In contrast, when the upper blank flag is not ON (S81: NO), the process moves to S83.

In S82, the CPU 21 alters a head pointer in the object page image data to the upper blank position. The upper blank position is acquired in S44 of the edge detection processing program, and corresponds to the position of the first page edge 53 or the second page edge 63. The MFD 1 sets the data after the head pointer in the object page image data as an output object. Therefore, the blank region positioned above the upper edge, for example, the first page white blank region 52 or the second page white blank region 62, is excluded from the output object, and is not outputted to the recording medium 20. After altering the position of the head pointer, the process moves to S83.

In S83, the CPU 21 determines whether the lower blank flag is ON by referring to the RAM 23. The lower blank flag is a flag that is turned ON in S47 of the edge detection processing program, and indicates that a lower blank region is present in the object page image data. When the lower blank flag is ON (S83: YES), the process moves to S84. In contrast, when the lower blank flag is not ON (S83: NO), the CPU 21 ends the blank region removal processing program.

In S84, the CPU 21 alters the last pointer in the object page image data to the lower blank position. The lower blank position is acquired in S48 of the edge detection processing program, and corresponds to the position of the first page edge 53 or the second page edge 63. The MFD 1 sets the data before the last pointer in the object page image data as an output object. Therefore, the blank region, for example, the first page white blank region 52 or the second page white blank region 62, positioned below the lower edge is excluded from the output object and is not outputted to the recording medium 20. After altering the position of the last pointer, the CPU 21 ends the blank region removal processing program.

As described above, the MFD 1 and the document copy processing program may acquire first page image data 50 and second page image data 60 from an open document G in an open state, and may output these onto a single recording medium 20. As such, this MFD 1 may provide an output similar to or the same as the open document G in the open state to a user.

The MFD 1 and the document copy processing program output the first page image data 50 and the second page image data 60 onto a single recording medium 20 in a mode in which either of these is rotated by 180 degrees based on the opening direction (S14) of the open document G (S15, S16, S19). In other words, the MFD 1 and the document copy processing program may output the first page image and the second page image in the same orientation even if the open document G is read on a page basis by successively rotating by 180 degrees when outputting the first page image data 50 and the second page image data 60. As a result, an output in which the image based on the first page image data 50 and the image based on the second page image data 60 are arranged in the same orientation on the recording medium 20 may be provided to a user.

The MFD 1 and the document copy processing program determines the arrangement of the first page image and the second page image on the recording medium 20 based on the opening direction of the open document G (S17), and outputs the first page image data 50 and the second page image data 60 onto a single recording medium 20 based on the determined arrangement (S19). As such, the MFD 1 and the document copy processing program may provide an output having the same arrangement as that of the first page image and the second page image in the open document G. In other words, the MFD 1 and the document copy processing program may provide an output which may read in the same order as the reading order of the open document G.

Even when white blank regions, e.g., the first page white blank region 52 and the second page white blank region 62, are included in the first page image data 50 and the second page image data 60 read on a page basis from an open document G, the MFD 1 and the document copy processing program excludes the white blank regions from the output objects (S18) and performs output based on the first page image data 50 and the second page image data 60 (S19). In other words, even when two page image data having white blank regions are outputted by rotating one of the pages by 180 degrees, the level difference D is not generated between the first page image and the second page image positioned on the left side and the right side of the recording medium 20, respectively. As a result, the first page image and the second page image are outputted at the same height on the left portion and the right portion of the output.

Further, the MFD 1 and the document copy processing program also exclude white blank regions which do not cause a level difference D from the output objects for output (S18), and performs output based on the open document G (S19). Therefore, in the output of the MFD 1 and the document copy processing program, the right side and the left side of the recording medium 20 are in the same mode between the right side and the left side of the recording medium 20 except for the page image portions.

The auxiliary object pixels whose densities are acquired through the auxiliary pixel density acquisition processing are not limited to the above-described three pixels, and may be a single pixel adjacent to the object pixel 90, or the number of auxiliary object pixels may be greater than three pixels.

Referring to FIGS. 19-25(A), another embodiment of the present invention is depicted. This embodiment is similar to the above-described embodiments of the present invention. Therefore, only those features of this embodiment of the present invention which are different than the above-described embodiments of the present invention are discussed with respect to this embodiment of the present invention.

Figure 19:
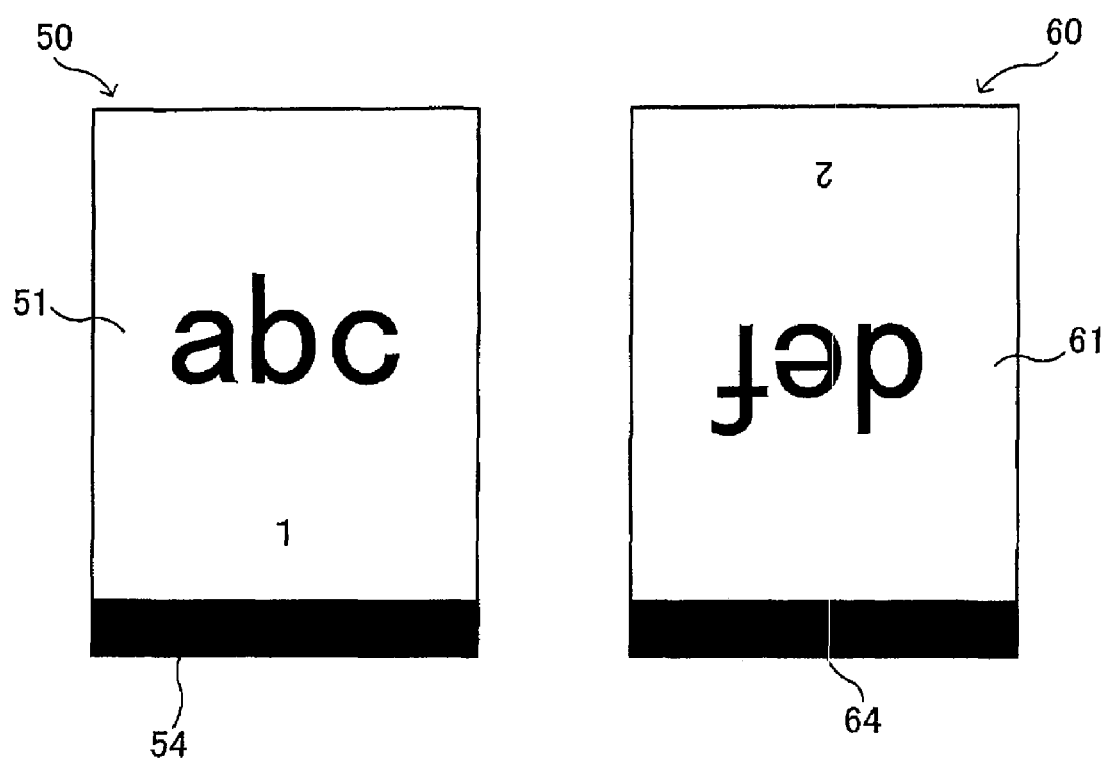
FIG. 19 is a view depicting compositions of first page image data and second page image data, according to another embodiment of the present invention.

In this embodiment of the present invention, the first page image data 50 and the second page image data 60 may be different than the first page image data 50 and the second page image data 60 of the above-described embodiments of the present invention. Referring to FIG. 19, the first page image data 50 of this embodiment may comprise a first document page image region 51 and a first page black blank region 54. Similarly, the second page image data 60 may comprise a second document page image region 61 and a second page black blank region 64. In other words, the object page image data in this embodiment may not have an edge and a white blank region, but may have a black blank region. The black blank region may comprise a portion of the document included as a black image in the object page image data read by the image reading unit 3A when, for example, a user instructs copying while the document cover 8 is open or the document is relatively thick. In other words, the MFD 1 of this embodiment sets page image data including black blank regions as processing objects, and based on the page image data, provides a readily viewable output to a user.

Figure 20:
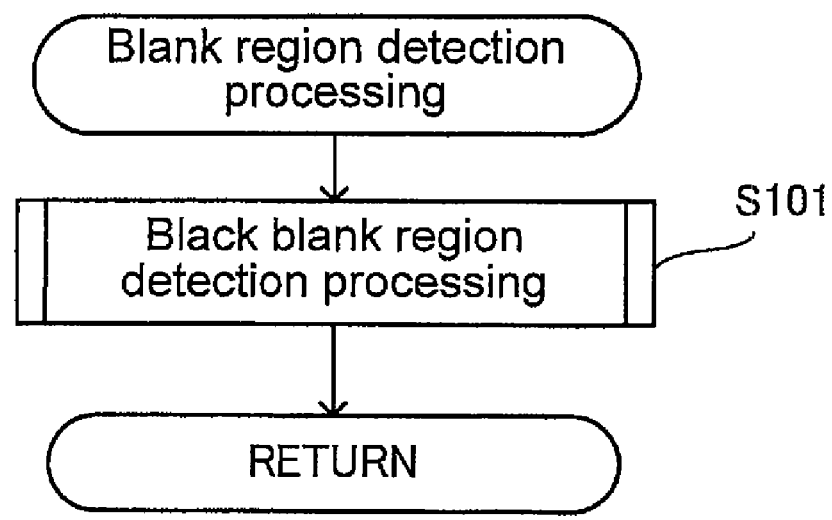
FIG. 20 is a flowchart of a blank region detection processing program, according to another embodiment of the present invention.

Referring to FIG. 20, a flowchart of the blank region detection processing program of this embodiment is depicted. The blank region detection processing program detects a black blank region, e.g., the first page black blank region 54 or the second page black blank region 64, included in the object page image data. The CPU 21 executes the blank region detection processing program in S21 and S24 of the level difference elimination processing program of FIG. 9.

As shown in FIG. 20, when beginning execution of the blank region detection processing program, first, the CPU 21 executes black blank region detection processing (S101). In the black blank region detection processing (S101), the CPU 21 executes a black blank region detection processing program. By executing the black blank region detection processing program, the CPU 21 identifies a black blank region, e.g., the first page black blank region 54 or the second page black blank region 64, included in the object page image data. After completing the black blank region detection processing (S101), the CPU 21 ends the blank region detection processing program.

Figure 21:
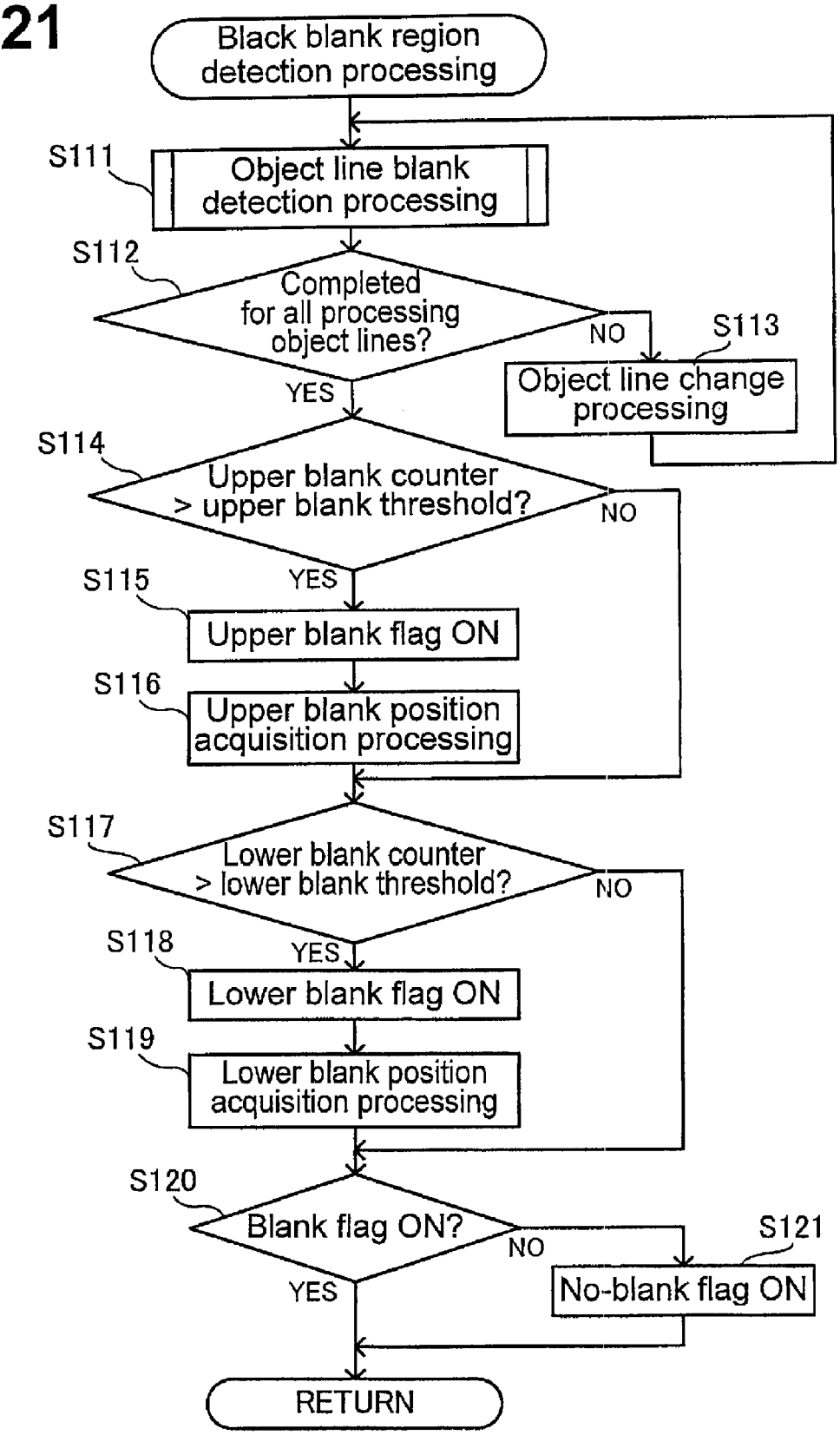
FIG. 21 is a flowchart of a black blank region detection processing program, according to another embodiment of the present invention.

Referring to FIG. 21, a flowchart of the black blank region detection processing program (S101) is depicted. In S101, the CPU 21 first executes object line blank region detection processing (S111). In the object line blank region detection processing (S11), the CPU 21 sets one line in the vertical direction, e.g., the sub-scanning direction X, of the object page image data as a processing object, and detects black pixel data of a black blank region in the line as the processing object, i.e., the processing object line. After completing the object line blank region detection processing (S111), the process moves to S112.

In S112, the CPU 21 determines whether the object line blank region detection processing (S111) has been executed for all vertical lines of the object page image data. The number of pixels in one line of the document page in the main scanning direction is determined based on the resolution of the reading of the document, such that based on the number of pixels, it is determined whether all processing object lines have been processed. When the processing has been completed for all lines (S112: YES), the process moves to S114. In contrast, when the processing has not yet been completed for all processing object lines (S112: NO), the CPU 21 executes the object line altering processing (S113). In the object line altering processing (S113), the CPU 21 alters the processing object to a line which has not been subjected to the object line blank region detection processing (S111) among the vertical lines of the object page image data. In detail, the processing object line is shifted by one line in the main scanning direction, e.g., the horizontal direction. After the object line altering processing (S113), the CPU 21 returns the process to S111, and executes the object line blank region detection processing for the new object line.

In S114, the CPU 21 determines whether the value of the upper blank counter of the RAM 23 is greater than an upper blank threshold. The value of the upper blank counter may indicate the number of processing object lines determined to include the presence of a black pixel group of a black blank region in the upper portion of the object page image data in the object line blank region detection processing (S111). The upper blank threshold is a criterion for determining the presence of the first page black blank region 54 or the second page black blank region 64 in the upper portion of the object page image data, e.g., the upper black blank region, and indicates the number of processing object lines determined to be include the presence of a black pixel group of the upper black blank region.

When the value of the upper blank counter is greater than the upper blank threshold (S114: YES), the CPU 21 determines that an upper black blank region is present in the object page image data, and turns an upper blank flag ON (S115). Thereafter, the CPU 21 executes upper blank position acquisition processing (S116). In the upper blank position acquisition processing (S116), the CPU 21 acquires the position of the upper black blank region based on an upper blank border position. The upper blank border position is the position of the border between the upper black blank region and the first document page image region 51 or the second document page image region 61. After completing the upper blank position acquisition processing (S116), the process moves to S117. In contrast, when the value of the upper blank counter is less than or equal to the upper blank threshold (S114: NO), the CPU 21 determines that no upper black blank region is present in the object page image data, and the process moves to S117.

In S117, the CPU 21 determines whether the value of the lower blank counter of the RAM 23 is greater than a lower blank threshold. The value of the lower blank counter indicates the number of processing object lines determined to include the presence of a black pixel group of a black blank region in the lower portion of the object page image data in the object line blank region detection processing (S111). The lower blank threshold is a criterion for determining the presence of the first page black blank region 54 or the second page black blank region 64, e.g., the lower black blank region, in the lower portion of the object page image data, and indicates the number of processing object lines determined to include the presence of a black pixel group of the lower black blank region.

When the value of the lower blank counter is greater than the lower blank threshold (S117: YES), the CPU 21 determines that a lower black blank region is present in the object page image data and turns the lower blank flag ON (S118). The CPU 21 then executes lower blank position acquisition processing (S119). In the lower blank position acquisition processing (S19), the CPU 21 acquires the position of the lower black blank region based on the position of a lower blank border. The lower blank border position is the position of the border between the lower black blank region and the first document page image region 51 or the second document page image region 61. After completing the lower blank position acquisition processing (S119), the process moves to S120. In contrast, when the value of the lower blank counter is less than or equal to the lower blank threshold (S117: NO), the CPU 21 determines that no upper black blank region is present in the object page image data, and the process moves to S120.

In S120, the CPU 21 determines whether the blank flag is ON by referring to the RAM 23. The blank flag comprises the upper blank flag and the lower blank flag. In other words, the CPU 21 makes the determination of S120 based on whether either the upper blank flag or the lower blank flag is ON or both flags are OFF. When the blank flag is ON (S120: YES), the CPU 21 ends the black blank region detection processing program. In contrast, when the blank flag is not ON (S120: NO), the CPU 21 turns the no-blank flag indicating that the black blank region, e.g., the first page black blank region 54 or the second page black blank region 64, is not present in the object page image data ON (S121). The CPU 21 then ends the black blank region detection processing program.

The black blank region detection processing is for determining whether a region of black pixels detected in the object line blank region detection processing may be regarded as a blank region, and when it is a blank region, turning the upper blank flag or the lower blank flag ON and moving the process to blank region removal processing.

Figure 22:
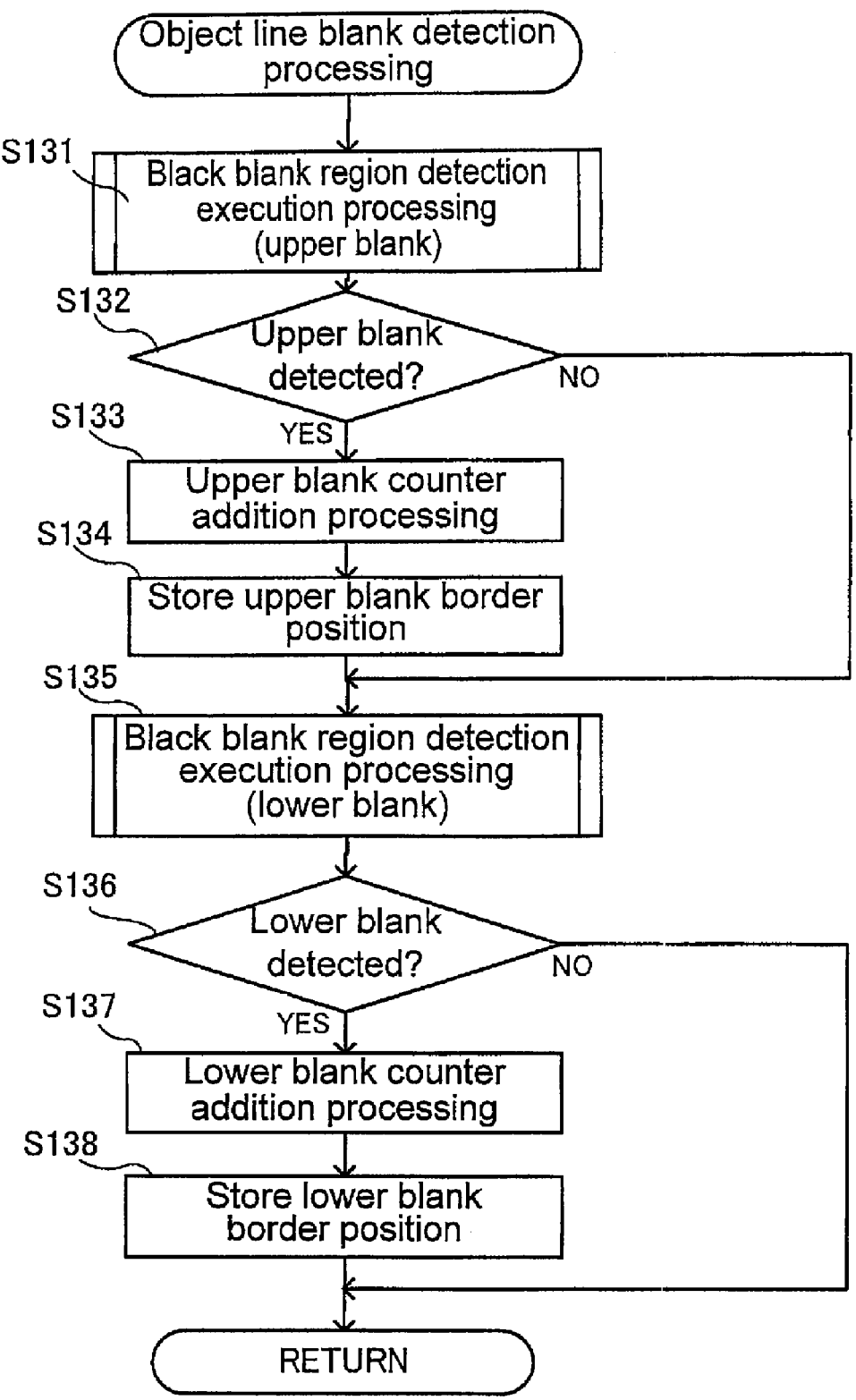
FIG. 22 is a flowchart of an object line blank region detection processing, according to another embodiment of the present invention.

Referring to FIG. 22 a flowchart of the object line blank region detection processing program (S111) is depicted. In S111, the CPU 21 executes black blank region detection execution processing for the upper portion of a processing object line (S131). In the black blank region detection execution processing (S131), the CPU 21 executes a black blank region detection execution processing program by setting pixels positioned in the upper portion of the processing object line as processing objects. A predetermined number of pixels from the head of pixels of the processing object line are selected as upper pixels in advance. By executing the black blank region detection execution processing (S131), the CPU 21 may detect a black pixel group of a black blank region in the upper portion of the processing object line. After completing the black blank region detection execution processing (S131), the process moves to S132.

In S132, the CPU 21 determines whether a black pixel group of an upper black blank region has been detected from the processing object line based on the detection result of the black blank region detection execution processing (S131). When a black pixel group of an upper black blank region is detected (S132: YES), the CPU 21 adds "1" to the value of the upper blank counter stored in the RAM 23 (S133), and as an upper blank border position on the processing object line, stores the position of the lower most end of the detected black pixel group in the RAM 23 (S134). After storing the upper blank border position on the processing object line in the RAM 23, the process moves to S135. In contrast, when no black pixel group of an upper black blank region is detected (S132: NO), the CPU 21 the process moves to S135.

In S134, the CPU 21 successively detects black pixel groups in the processing object lines, and each time a black pixel group is detected, the CPU 21 determines whether the position, e.g., distance, of the black pixel at the lower most end of the black pixel group is greater than the position, e.g., distance, stored in the RAM 23. When the position at the lower most end is greater than the position stored in the RAM 23, the position at the lower most end is stored in the RAM 23. Therefore, the distance, e.g., number of pixels, from the detection start line of the black pixel positioned at the upper most side among pixels positioned at the lower ends of the plurality of black pixel groups when the black pixel groups detected from the respective processing object lines are compared with each other is stored in the RAM 23. Then, the value of the position finally stored in the RAM 23 is the upper blank position of the upper black blank region acquired through the upper blank position acquisition processing (S116) of the black blank region detection processing.

In S135, the CPU 21 executes black blank region detection execution processing for the lower portion of the processing object line. A predetermined number of pixels from the rear end of the pixels of the processing object line is determined as the lower pixels in advance. In the black blank region detection execution processing (S135), the CPU 21 executes a black blank region detection execution processing program by setting the pixels positioned in the lower portion of the processing object line as processing objects. By executing the black blank region detection execution processing (S135), the CPU 21 may detect a black pixel group of a black blank region in the lower portion of the processing object line. After completing the black blank region detection execution processing (S135), the process moves to S136.

In S136, the CPU 21 determines whether a black pixel group of a lower black blank region has been detected from the processing object line based on the detection result of the black blank region detection execution processing (S135). When a black pixel group of a lower black blank region is detected (S136: YES), the CPU 21 adds "1" to the value of the lower blank counter stored in the RAM 23 (S137), and stores the position of the upper most end of the detected black pixel group in the RAM 23 as a lower blank border position in the processing object line (S138). After storing the lower blank border position in the processing object line in the RAM 23, the CPU 21 ends the object line blank region detection processing program. In contrast, when no black pixel group of a lower black blank region is detected (S136: NO), the CPU 21 ends the object line blank region detection processing program.

In S138, the CPU 21 detects the presence of a black pixel group from each processing object line in order, and each time it is detected, determines whether the position of the black pixel at the upper most end of the black pixel group is less than the position, e.g., distance, stored in the RAM 23. When the position at the upper most end is less than the position stored in the RAM 23, the position at the upper most end is stored in the RAM 23. Therefore, in the RAM 23, the distance, e.g., number of pixels, from the detection start line of the black pixel positioned lowest among the pixels positioned at the upper ends of a plurality of black pixel groups detected from the respective processing object lines when comparing the black pixel groups is stored. In the processing, the value of the position finally stored in the RAM 23 is the lower blank position of the lower black blank region acquired through the upper blank position acquisition processing (S119) in the above-described black blank region detection processing.

By executing the object line blank region detection processing program, it may be detected whether the black pixel groups detected from the processing object lines are continuous in the main scanning direction, e.g., whether the black pixel groups regarded as a blank region not only are present in the sub-scanning direction but also in the main scanning direction and form a region comprising black pixels.

Figure 23:
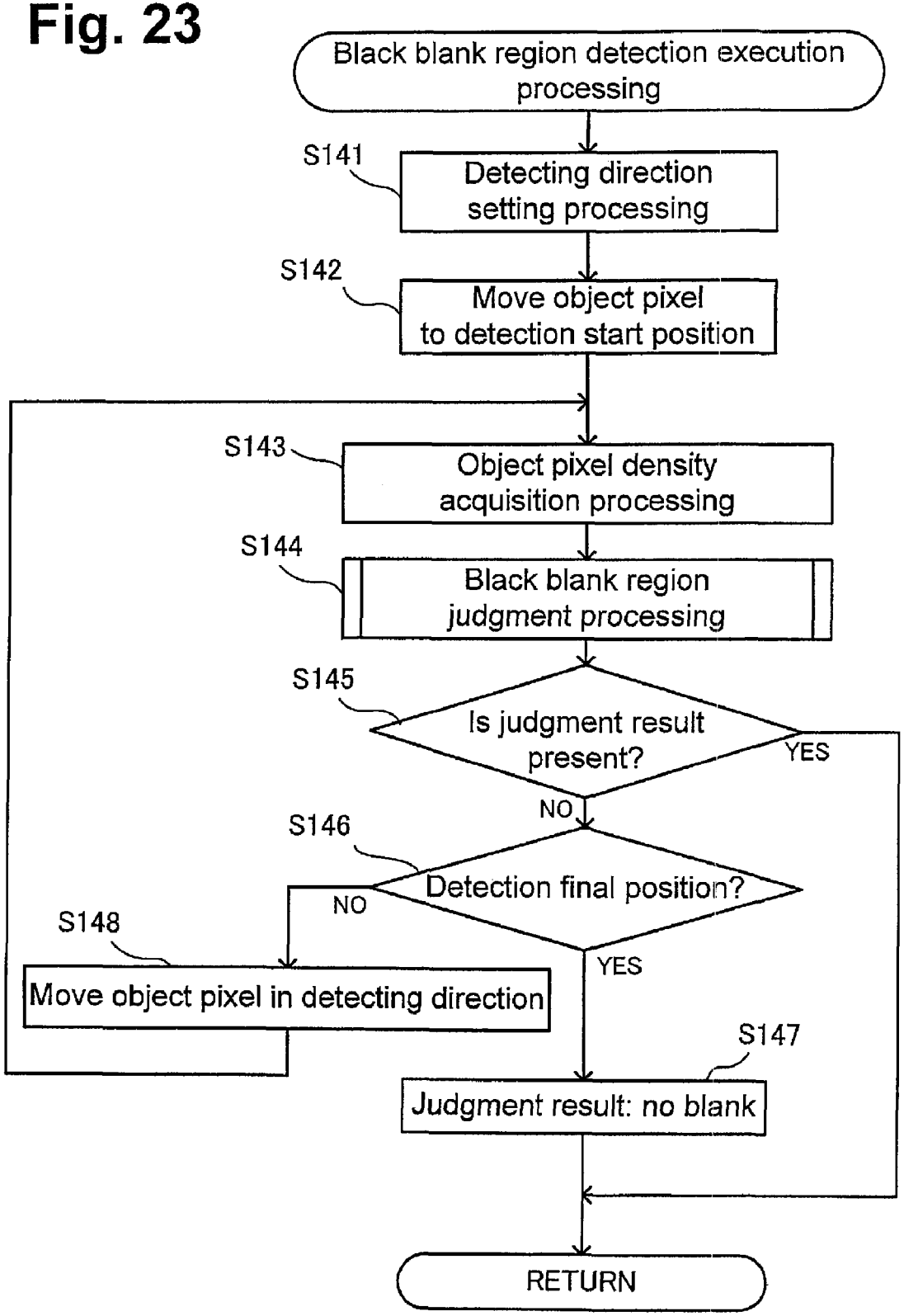
FIG. 23 is a flowchart of a black blank region detection execution processing program, according to another embodiment of the present invention.

Referring to FIG. 23, a flowchart of the black blank region detection execution processing program (S131 or S135) is depicted. In S131 or S135, the CPU 21 first executes detecting direction setting processing (S141). In the detecting direction setting processing (S141), the CPU 21 sets a black pixel group detecting direction in the processing object lines based on whether an upper black blank is to be detected (S131) or a lower black blank is to be detected (S135). In the case of upper black blank region detection (S131), the CPU 21 sets a detecting direction for detecting black pixel groups in order from the detection start position, e.g., the upper most end of the processing object line, toward the lower side. In contrast, in the case of lower black blank region detection (S135), the CPU 21 sets a detecting direction for detecting black pixel groups in order from the detection start position, e.g., the position at the lower most end of the processing object line, toward the upper side. After completing the detecting direction setting processing (S141), the process moves to S142.

In S142, the CPU 21 moves the object pixel to the detection start position. As described above, the detection start position is a pixel positioned at the upper most end of the processing object line in the case of the upper black blank region detection (S131), and is a pixel positioned at the lower most end of the processing object line in the case of the lower black blank region detection (S135). After moving the object pixel to the detection start position, the process moves to S143.

In S143, the CPU 21 executes object pixel density acquisition processing for the current object pixel. The object pixel density acquisition processing (S143) is similar to the object pixel density acquisition processing (S54) of the previous embodiments. After acquiring density data of the object pixel through the object pixel density acquisition processing (S143), the process moves to black blank region determination processing (S144).

In S144, the CPU 21 executes black blank region determination processing. In the black blank region determination processing (S144), the CPU 21 executes a black blank region determination processing program. By executing the black blank region determination processing program, based on the object pixel density acquired through the object pixel density acquisition processing (S143), the CPU 21 determines whether the object pixel is a black pixel of a black blank region, and reaches the determination indicating whether the black blank region is present in the processing object line. After completing the black blank region determination processing (S144), the process moves to S145.

In the black blank region determination processing, the CPU 21 some times cannot determine the presence of the black blank region in the processing object line. In these cases, the CPU 21 determines neither "determination: blank region found" nor "determination: no blank region."

In S145, the CPU 21 determines whether the determination of the presence of a black blank region in the processing object line through the black blank region determination processing (S144) is present in the RAM 23. In other words, in S145, the CPU 21 determines whether either the determination: blank region found or the determination: no blank region is stored in the RAM 23. When either one of these determinations is stored in the RAM 23 (S145: YES), the CPU 21 ends the black blank region detection execution processing program. In contrast, when neither of these determinations is stored in the RAM 23 (S145: NO), the process moves to S146.

In S146, the CPU 21 determines whether the current object pixel is a pixel at the detection final position. The detection final position is the position moved by a plurality of pixels determined in advance as the upper pixels or lower pixels in the detecting direction from the detection start position. When the current object pixel is the pixel at the detection final position (S146: YES), the CPU 21 stores the determination: no blank region in the RAM 23 as a determination of the presence of the black blank region in the processing object line (S147). After storing the determination: no blank in the RAM 23, the CPU 21 ends the black blank region detection execution processing program. In contrast, when the current object pixel is not the pixel at the detection final position (S146: NO), the process moves to S148.

In S148, the CPU 21 moves the object pixel in the detecting direction selected in the detecting direction setting processing on the processing object line. Then, after moving the object pixel in the detecting direction, the CPU returns the process to the object pixel density acquisition processing (S143). As such, a new pixel is selected as the object pixel (S148), such that the CPU 21 may execute the black blank region determination processing (S144) for the new object pixel. By executing the black blank region execution processing program, it may be detected whether black pixels are present continuously in processing object line, e.g., in the upper portion or the lower portion of the processing object line. The black blank region execution processing program is executed for all processing object lines of a document page.

Figure 24:
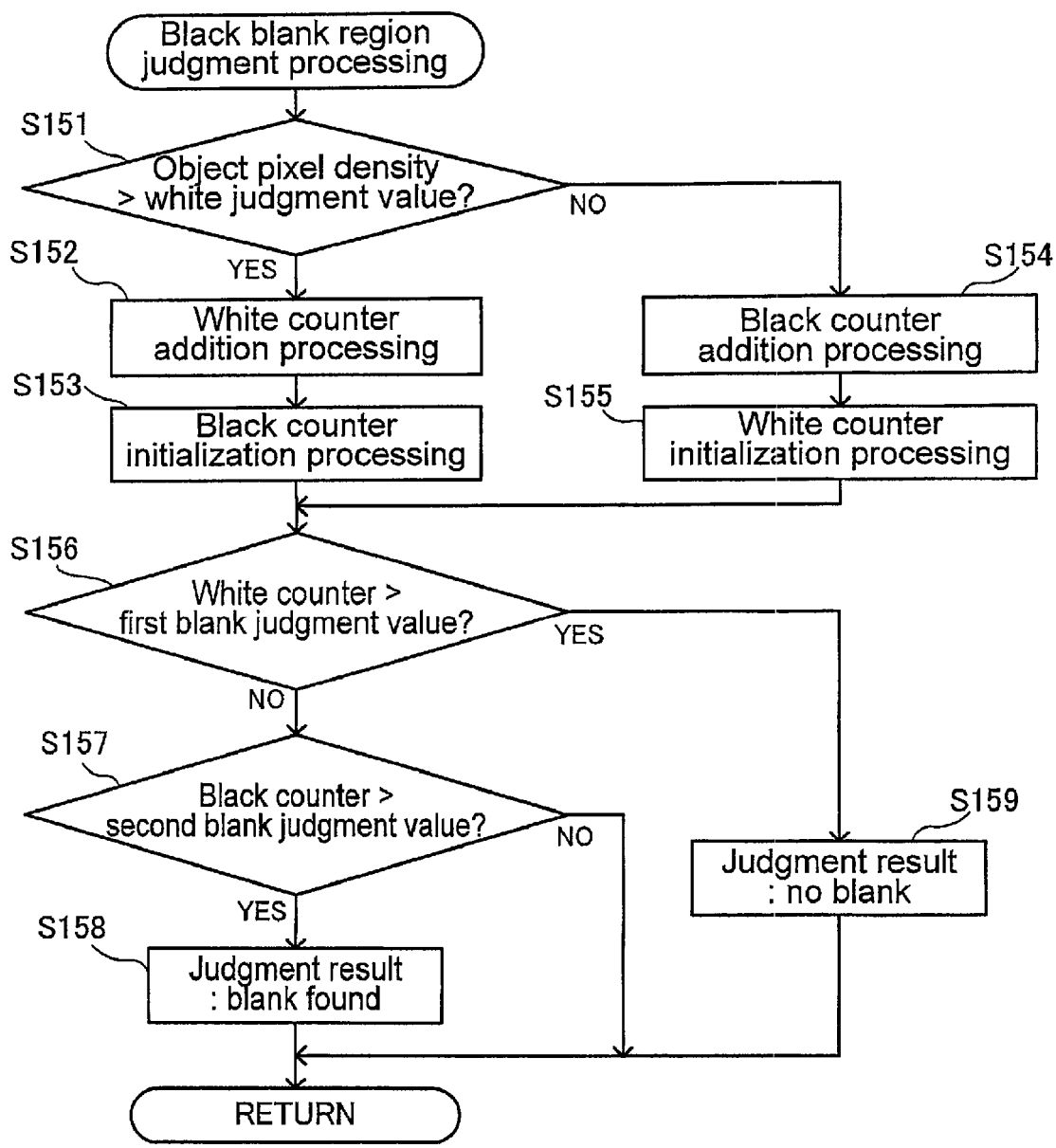
FIG. 24 is a flowchart of a black blank region determination-processing program, according to another embodiment of the present invention.
Figure 25A:
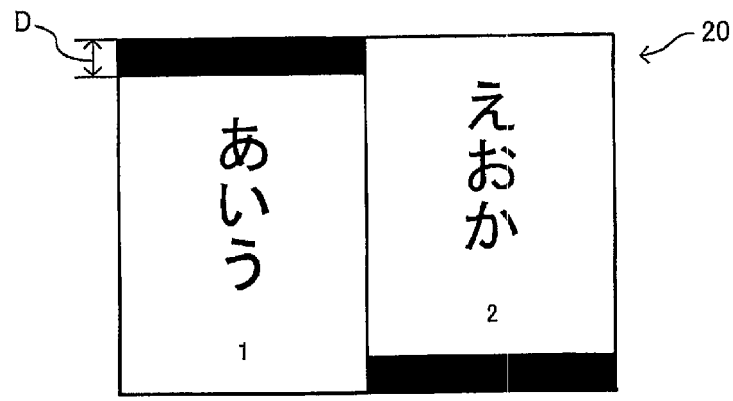
FIGS. 25(A)-25(D) are views depicting outputs of a right-open type open document, according to another embodiment of the present invention.
Figure 25B:
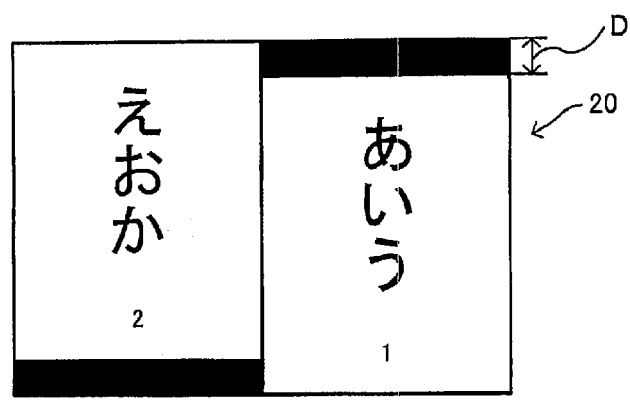
Figure 25C:
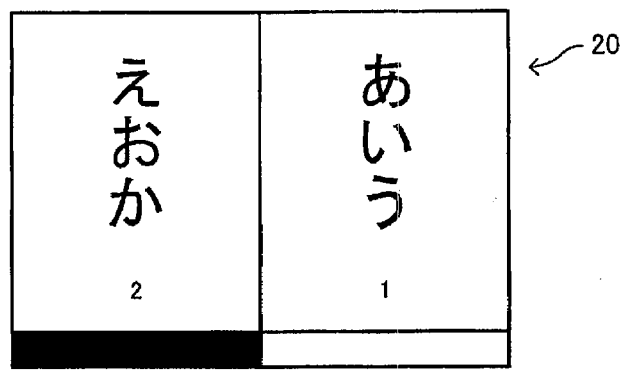
Figure 25D:
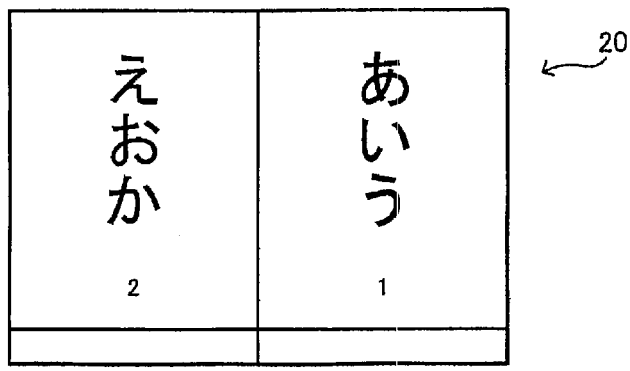

Referring to FIG. 24, a flowchart of the black blank region determination processing program (S144) is depicted. In S144, the CPU 21 first determines whether the object pixel density acquired through the object pixel density acquisition processing (S143) is greater than a white determination value (S151). The white determination value is a density value used as a criterion for determining whether the pixel is a black pixel of a black blank region. A pixel that is not a black pixel of a black blank region is referred to as a white-determined pixel.

When the object pixel density is greater than the white determination value (S151: YES), the CPU 21 determines the object pixel as a white-determined pixel, and adds "1" to a white counter of the RAM 23 (S152). The white counter is for counting the number of white-determined pixels present continuously on the processing object line. After adding "1" to the white counter, the CPU 21 initializes the value of a black counter of the RAM 23 to "0" (S153). The black counter is for counting the number of pixels determined to be black pixels which are present continuously on the processing object line and compose a black blank region. After initializing the value of the black counter, the process moves to S156.

In contrast, when the object pixel density is less than or equal to the white determination value (S151: NO), the CPU 21 determines the object pixel as a black pixel which may be a black blank region, and adds "1" to the value of the black counter in the RAM 23 (S154). After adding "1" to the black counter, the CPU 21 initializes the value of the white counter in the RAM 23 to "0" (S155). After initializing the value of the white counter, the process moves to S156.

In S156, the CPU 21 determines whether the value of the white counter is greater than a first blank region determination value. The first blank region determination value may be a criterion for determining whether a black blank region is present on the processing object line. When the value of the white counter is greater than the first blank region determination value (S156: YES), a substantial number of white-determined pixels, e.g., greater than the first white determination value, are present continuously on the processing object line. In other words, in this case, black pixels of a black blank region are not present continuously on the processing object line. Therefore, when the value of the white counter is greater than the first blank region determination value (S156: YES), the CPU 21 stores the determination: no blank region the RAM 23 as a determination for the processing object line (S159). Thereafter, the CPU 21 ends the black blank region determination processing program. In contrast, when the value of the white counter is less than or equal to the first blank region determination value (S156: NO), the process moves to S157.

In S157, the CPU 21 determines whether the value of the black counter is greater than a second blank region determination value. The second blank region determination value may be a criterion for determining whether a black blank region is present on the processing object line. When the value of the black counter is greater than the second blank region determination value (S157: YES), a substantial number of black pixels, e.g., greater than the second blank region determination value, are present continuously on the processing object line. In other words, in this case, black pixels of a black blank region are present continuously on the processing object line. Therefore, when the value of the black counter is greater than the second blank region determination value (S157: YES), the CPU 21 stores the determination: blank region found in the RAM 23 as a determination for the processing object line (S158). Thereafter, the CPU 21 ends the black blank region determination processing program. In contrast, when the value of the black counter is less than or equal to the second blank region determination value (S157: NO), the CPU 21 ends the black blank region determination processing program. In this case, neither of the determination: blank region found nor the determination: no blank region is stored in the RAM 23.

Figure 26:
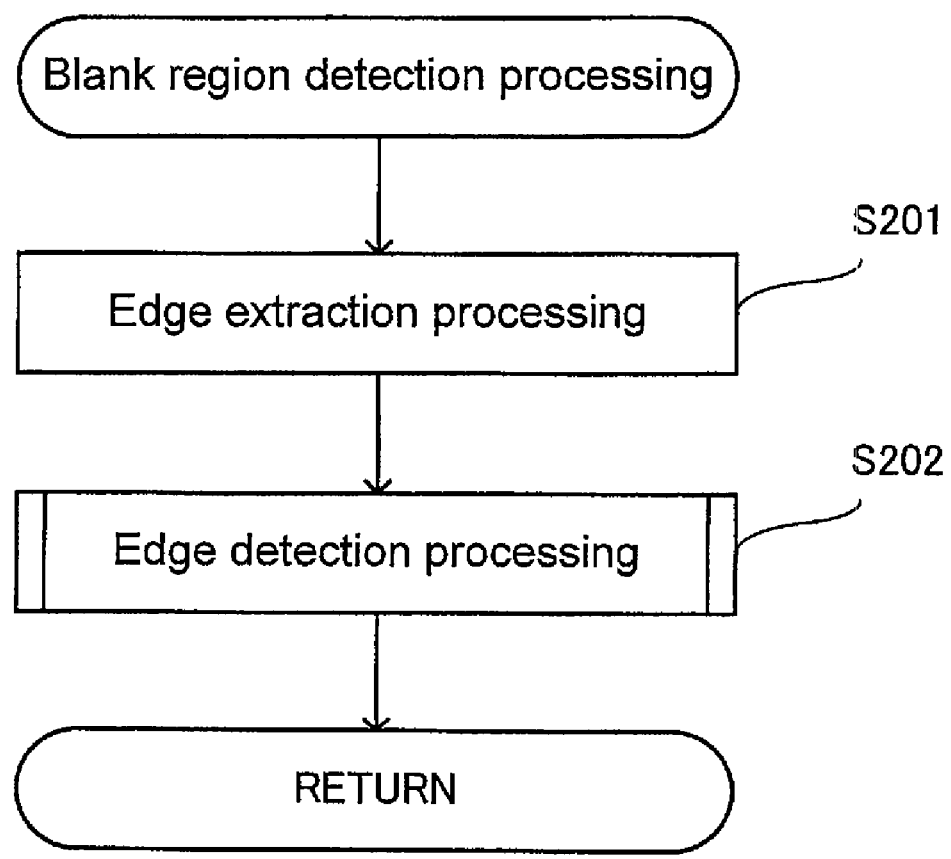
FIG. 26 is a flowchart of a blank region detection processing program, according to yet another embodiment of the present invention.

Referring to FIGS. 26 and 27, yet another embodiment of the present invention is depicted. This embodiment is similar to the above-described embodiments of the present invention. Therefore, only those features of this embodiment of the present invention which are different than the above-described embodiments of the present invention are discussed with respect to this embodiment of the present invention.

Referring to FIG. 26, a flowchart of the blank region detection processing program of this embodiment of the present invention is depicted. In S21 or S24 of the level difference elimination processing program, the CPU 21 first executes edge extraction processing (S201). In the edge extraction processing (S201), the CPU 21 extracts a portion at which the density or luminance of each pixel of the object page image data rapidly alters as an edge. Based on the edge extraction processing, the CPU 21 may extract the border of the document page image region, e.g., the first document page image region 51 or the second document page image region 61, regardless of whether an out-of-document portion of the object document page image data is a black blank region or a white blank region. After completing the edge extraction processing (S201), the process moves to S202. The edge extraction processing may be a known process.

In S202, the CPU 21 executes edge detection processing. In the edge detection processing (S202), the CPU 21 executes the above-described edge detection processing program. After completing the edge detection processing (S202), the CPU 21 ends the blank region detection processing program.

Referring to FIG. 27, in another embodiment of the present invention, instead of rotating either the first page image data 50 or the second page image data 60 by 180 degrees, the first page image data 50 or the second page image data 60 may be read in an opposite reading direction. As shown in FIG. 27, by setting the reading direction of the first page image data 50 or the second page image data 60 to the opposite direction, its output is rotated by 180 degrees.

While the invention has been described in connection with preferred embodiments, it will be understood by those of ordinary skill in the art that other variations and modifications of the preferred embodiments described above may be made without departing from the scope of the invention. Other embodiments will be apparent to those skilled in the art from a consideration of the specification or practice of the invention disclosed herein. It is intended that the specification and the described examples only are considered as exemplary of the invention, with the true scope of the invention being defined by the following claims.

What is claimed is:

1. An image processing apparatus comprising:
a reading unit configured to read an open document, wherein the open document comprises a first page comprising a first image and a second page comprising a second image;
a storing unit configured to store the first page read by the reading unit as first page image data comprising the first image, and to store the second page read by the reading unit as second page image data comprising the second image;
a designating unit configured to identify whether the open document is a first type of open document or a second type of open document which is different than the first type of open document;
a rotation unit configured to rotate the first page image data 180 degrees relative to the second page image data when the open document is the first type of open document and to rotate the second page image data 180 degrees relative to the first page image data when the open document is the second type of open document; and
an output unit configured to record at least one portion of the first image data and at least one portion of the second image data on a single recording medium, wherein the at least one portion of the first image data comprises the first image and at least one portion of the second image data comprises the second image, wherein an orientation of the first image data on the single recording medium is the same as an orientation of the second image data on the single recording medium.

2. The apparatus of claim 1, wherein the open document has a center, the first page is positioned on a first side of the center, and the second page is positioned on a second side of the center opposite the first side of the center.

3. The apparatus of claim 1, wherein the first type of open document comprises a right open type of open document configured to open in a first direction, and the second type of opening document comprises a left type of open document configured to open in a second direction opposite the first direction.

4. The apparatus of claim 1, wherein the first page is an odd numbered page and the second page is an even number page, and the reading unit is configured to read the first page before reading the second page.

5. The apparatus of claim 3, wherein when the open document is the right open type of document, the output unit is configured to record the second image on a left side portion of the single recording medium and to record the first image on a right side portion of the single recording medium.

6. The apparatus of claim 3, wherein when the open document is the left open type of document, the output unit is configured to record the first image on a left side portion of the single recording medium and to record the second image on a right side portion of the single recording medium.

7. The apparatus of claim 1, wherein the first page image data further comprises a first non-image region when a length of the first page in a sub-scanning direction is less than a reading range of the reading unit in the sub-scanning direction, and the at least one portion of the first page image data does not comprise the first non-image region.

8. The apparatus of claim 7, wherein the second page image data further comprises a second non-image region when a length of the second page in the sub-scanning direction is less than the reading range of the reading unit in the sub-scanning direction, and the at least one portion of the second page image data does not comprise the second non-image region.

9. The apparatus of claim 7, further comprising a detection unit, wherein a first black line comprising a first plurality of black pixels extends from a first end of the first page image data to a second end of the first page image data in a scanning direction perpendicular to the sub-scanning direction, and the first black line is positioned between the first image and the first non-image region, wherein the detection unit is configured to determine a location of the first non-image region based on a location of at least a portion of the first black line.

10. The apparatus of claim 8, further comprising a detection unit, wherein a first black line comprising a first plurality of black pixels extends from a first end of the first page image data to a second end of the first page image data in a scanning direction opposite the sub-scanning direction, and the first black line is positioned between the first image and the first non-image region, wherein the detection unit is configured to determine a location of the first non-image region based on a location of at least a portion of the first black line.

11. The apparatus of claim 10, wherein a second black line comprising a second plurality of black pixels extends from a first end of the second page image data to a second end of the second page image data in the scanning direction, and the second black line is positioned between the second image and the second non-image region, wherein the detection unit is further configured to determine a location of the second non-image region based on a location of at least a portion of the second black line.

12. The apparatus of claim 11, wherein the first black line and the second black line each comprise a plurality of lines in the sub-scanning direction.

13. The apparatus of claim 7, wherein the first non-image region comprises a first plurality of black pixels.

14. The apparatus of claim 13, wherein the second non-image region comprises a second plurality of black pixels.

15. A method of controlling an image processing apparatus, comprising the steps of:
reading an open document, wherein the open document comprises a first page comprising a first image and a second page comprising a second image;
storing the first page as first page image data comprising the first image in a memory;
storing the second page as second page image data comprising the second image in the memory;
identifying whether the open document is a first type of open document or a second type of open document which is different than the first type of open document;
rotating the first page image data 180 degrees relative to the second page image data when the open document is the first type of open document;
rotating the second page image data 180 degrees relative to the first page image data when the open document is the second type of open document; and
recording at least one portion of the first image data and at least one portion of the second image data on a single recording medium, wherein the at least one portion of the first image data comprises the first image and at least one portion of the second image data comprises the second image, wherein an orientation of the first image data on the single recording medium is the same as an orientation of the second image data on the single recording medium.

16. The method of claim 15, wherein the first type of open document comprises a right open type of open document configured to open in a first direction, and the second type of opening document comprises a left type of open document configured to open in a second direction opposite the first direction.

17. The method of claim 15, wherein the first page image data further comprises a first non-image region when a length of the first page in a sub-scanning direction is less than a reading range of the reading unit in the sub-scanning direction, and the at least one portion of the first page image data does not comprise the first non-image region.

18. A non-transitory computer readable medium which, when executed by a processing arrangement, is configured to control an image processing apparatus by performing the steps of:
reading an open document, wherein the open document comprises a first page comprising a first image and a second page comprising a second image;
storing the first page as first page image data comprising the first image;
storing the second page as second page image data comprising the second image;
identifying whether the open document is a first type of open document or a second type of open document which is different than the first type of open document;
rotating the first page image data 180 degrees relative to the second page image data when the open document is the first type of open document;
rotating the second page image data 180 degrees relative to the first page image data when the open document is the second type of open document; and
recording at least one portion of the first image data and at least one portion of the second image data on a single recording medium, wherein the at least one portion of the first image data comprises the first image and at least one portion of the second image data comprises the second image, wherein an orientation of the first image data on the single recording medium is the same as an orientation of the second image data on the single recording medium.

19. The non-transitory computer readable medium of claim 18, wherein the first type of open document comprises a right open type of open document configured to open in a first direction, and the second type of opening document comprises a left type of open document configured to open in a second direction opposite the first direction.

20. The non-transitory computer readable medium of claim 18, wherein the first page image data further comprises a first non-image region when a length of the first page in a sub-scanning direction is less than a reading range of the reading unit in the sub-scanning direction, and the at least one portion of the first page image data does not comprise the first non-image region.

* * * * *